US012427775B2

(12) United States Patent
Kajihara et al.

(10) Patent No.: US 12,427,775 B2
(45) Date of Patent: Sep. 30, 2025

(54) PRINTER AND CLEANING LIQUID SUPPLY METHOD

(71) Applicant: SCREEN HOLDINGS CO., LTD., Kyoto (JP)

(72) Inventors: Kaisei Kajihara, Kyoto (JP); Mitsuru Tanemoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 162 days.

(21) Appl. No.: 18/456,959

(22) Filed: Aug. 28, 2023

(65) Prior Publication Data

US 2024/0100832 A1 Mar. 28, 2024

(30) Foreign Application Priority Data

Sep. 22, 2022 (JP) ................................ 2020-151247

(51) Int. Cl.
*B41J 2/165* (2006.01)

(52) U.S. Cl.
CPC ....... *B41J 2/16552* (2013.01); *B41J 2/16508* (2013.01); *B41J 2/16538* (2013.01); *B41J 2/16547* (2013.01); *B41J 2/16585* (2013.01)

(58) Field of Classification Search
CPC ........................ B41J 2/16585; B41J 2/16508; B41J 2/16538; B41J 2/16547; B41J 2/16552
See application file for complete search history.

(56) References Cited

FOREIGN PATENT DOCUMENTS

| | | | | |
|---|---|---|---|---|
| JP | 2015217593 A | * 12/2015 | | B41J 2/165 |
| JP | 2020-168798 A | 10/2020 | | |
| JP | 2022-052195 A | 4/2022 | | |

* cited by examiner

*Primary Examiner* — Geoffrey S Mruk
(74) *Attorney, Agent, or Firm* — Rimon P.C.

(57) ABSTRACT

The cleaning liquid supply mechanism ejects the cleaning liquid to an ejection target that is one of the cleaning roller and the cap. In particular, the cleaning liquid supply mechanism switches the ejection target between the cap and the cleaning roller and ejects the cleaning liquid to the ejection target. Specifically, if the cap is set as the ejection target, the cleaning liquid is ejected from the cleaning liquid supply mechanism directly to the cap as the ejection target. If the cleaning roller is set as the ejection target, the cleaning liquid is ejected from the cleaning liquid supply mechanism directly to the cleaning roller as the ejection target.

16 Claims, 18 Drawing Sheets

PRINTER AND CLEANING LIQUID SUPPLY METHOD

CROSS REFERENCE TO RELATED APPLICATION

The disclosure of Japanese Patent Application No. 2022-151247 filed on Sep. 22, 2022 including specification, drawings and claims is incorporated herein by reference in its entirety.

BACKGROUND OF THE INVENTION

1. Field of the Invention

The present invention relates to a technique of supplying a cleaning liquid to a cap member that performs capping of abutting on a printing head that ejects ink from an ink nozzle while facing the ink nozzle and to a cleaning member that cleans the cap member by coming into contact with the cap member.

2. Description of the Related Art

In a printer that performs printing using a printing head that ejects ink from an ink nozzle, a cap member for capping the ink nozzle is used for maintenance of the printing head. As the cap member is contaminated with the ink, the cap member is required to be cleaned appropriately. As described in JP2020-168798 and JP2015-217593, a cleaning liquid is usable for cleaning the cap member. According to JP2020-168798, for example, a cleaning liquid is fed from a cleaning liquid tank to a liquid storage recess of a cap member and the liquid storage recess of the cap member is cleaned with the fed cleaning liquid. According to JP2015-217593, a cap member is cleaned using a cleaning roller. More specifically, a cleaning liquid is dripped on a cap sheet placed in the cap member and the cap sheet is pressed with the rotating cleaning roller. By doing so, the interior and upper surface of the cap member are cleaned by the cleaning roller with the cleaning liquid adhering to the cleaning roller.

SUMMARY OF THE INVENTION

In performing cleaning with a cleaning liquid adhering to a cleaning member such as a cleaning roller, it is preferable to supply a clean cleaning liquid to the cleaning member. According to the method described in JP2015-217593, however, the cleaning liquid is supplied to the cleaning member (cleaning roller) through the cap sheet. Hence, the cleaning liquid to be supplied to the cleaning member is to contain ink, etc. leaking out from the cap sheet. In this regard, a technique allowing a clean cleaning liquid to be supplied to each of a cap member and a cleaning member has been desired.

The present invention has been made in view of the above-described problem, and is intended to allow a clean cleaning liquid to be supplied to each of a cap member and a cleaning member.

According to the present invention, a printer comprises: a printing head that ejects ink from an ink nozzle; a cap member that performs capping of abutting on the printing head while the cap member faces the ink nozzle; a cleaning member that cleans the cap member by coming into contact with the cap member; and a cleaning liquid ejection unit that ejects a cleaning liquid to an ejection target that is one of the cleaning member and the cap member, wherein the cleaning liquid ejection unit is configured to switch the ejection target between the cap member and the cleaning member and eject the cleaning liquid to the ejection target.

According to the present invention, a cleaning liquid supply method of supplying a cleaning liquid to a cap member and a cleaning member, the cap member performing capping of abutting on a printing head that ejects ink from an ink nozzle while the cap member faces the ink nozzle, the cleaning member cleaning the cap member by coming into contact with the cap member, the method comprising the steps of: ejecting the cleaning liquid to an ejection target that is one of the cleaning member and the cap member from a cleaning liquid ejection unit that ejects the cleaning liquid to the ejection target; and switching the ejection target between the cap member and the cleaning member.

According to the present invention (printer, cleaning liquid supply method) having the above-described configurations, the cleaning liquid ejection unit ejects the cleaning liquid to the ejection target that is one of the cleaning member and the cap member. In particular, the cleaning liquid ejection unit switches the ejection target between the cap member and the cleaning member and ejects the cleaning liquid to the ejection target. Specifically, if the cap member is set as the ejection target, the cleaning liquid is ejected from the cleaning liquid ejection unit directly to the cap member as the ejection target. If the cleaning member is set as the ejection target, the cleaning liquid is ejected from the cleaning liquid ejection unit directly to the cleaning member as the ejection target. Here, ejecting the cleaning liquid from the cleaning liquid ejection unit directly to the ejection target means that the cleaning liquid ejected from the cleaning liquid ejection unit reaches the ejection target without passing through a member different from the ejection target. In this way, according to the present invention, it is possible to supply the clean cleaning liquid to each of the cap member and the cleaning member.

As described above, according to the present invention, it is possible to supply the clean cleaning liquid to each of the cap member and the cleaning member.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
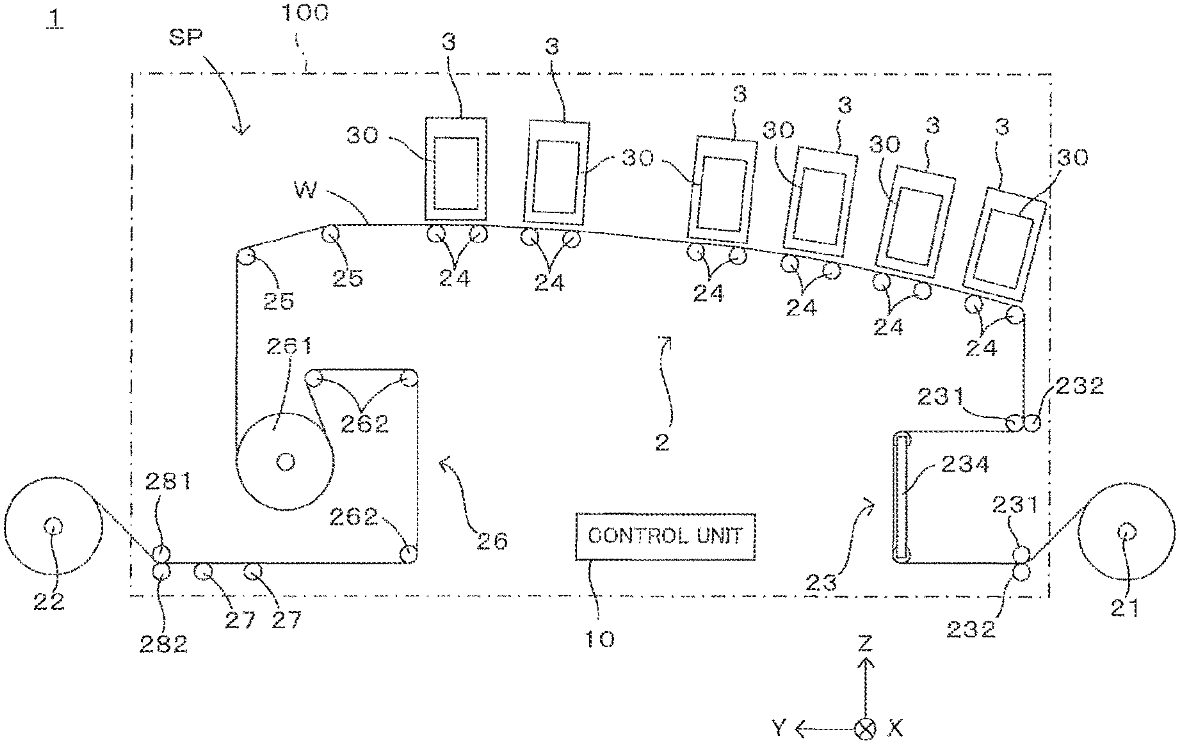
FIG. 1 is a front view schematically showing an example of a printer according to the present invention.

FIG. 1 is a front view schematically showing an example of a printer according to the present invention. In FIG. 1 and in its subsequent drawings, an X direction being a horizontal direction, a Y direction being a horizontal direction perpendicular to the X direction, and a Z direction being a vertical direction are shown as appropriate. A printer 1 prints an image on an elongated strip-shaped web (base material) W by ejecting ink to the web W by the inkjet method while transferring the web W in a roll-to-roll process inside a housing 100. A material of the web W is paper or a film. The web W has flexibility. The printer 1 includes a control unit 10 configured to control the printer 1 entirely in a centralized manner. The control unit 10 exerts control required for printing operation on the web W. The control unit 10 is composed of a processor such as a central processing unit (CPU).

The printer 1 includes a transfer part 2 that transfers the web W. The transfer part 2 includes a feed roller 21 and a wind-up roller 22. The web W is transferred in a roll-to-roll process by winding the web W fed from the feed roller 21 on the wind-up roller 22. The transfer part 2 includes a take-in part 23 provided between the feed roller 21 and the wind-up roller 22 for taking in the web W fed from the feed roller 21. The take-in part 23 includes two drive rollers 231, two nip rollers 232, and an edge position adjuster 234 provided between the two drive rollers 231. Each of the drive rollers 231 drives the web W by rotating in response to driving force of a motor with the web W wound around the drive roller 231. The two nip rollers 232 are provided corresponding to two drive rollers 231 respectively. Each of the nip rollers 232 holds the web W between the nip roller 232 and the corresponding drive roller 231. The edge position adjuster 234 adjusts the position of an edge of the web W in the X direction corresponding to the width direction of the web W.

The transfer part 2 further includes a plurality of support rollers 24 on which the web W is supported between the take-in part 23 and the wind-up roller 22. The support rollers 24 transfers the web W in the Y direction while supporting the web W from below to which ink is ejected by the inkjet method. In particular, the support rollers 24 are arranged at a tilt in such a manner that the support roller 24 located further downstream of a transfer direction of the web W (Y direction) is placed at a higher position. For this reason, when the web W is transferred by these support rollers 24, the web W is at a tilt during the transfer in such a manner as to rise as the web W goes further toward the Y direction.

The transfer part 2 further includes a plurality of support rollers 25 on which the web W is supported between the support rollers 24 and the wind-up roller 22, and a dryer 26 arranged between the support rollers 25 and the wind-up roller 22. The dryer 26 includes a heat drum 261, and a support roller 262 on which the web W moving from the heat drum 261 toward the wind-up roller 22 is supported. The heat drum 261 is driven to rotate in response to transfer of the web W, and dries the web W by heating the web W using a built-in heater. The transfer part 2 further includes a plurality of support rollers 27 on which the web W moving from the dryer 26 toward the wind-up roller 22 is supported. The transfer part 2 further includes a drive roller 281 and a nip roller 282 arranged between the support rollers 27 and the wind-up roller 22. The drive roller 281 drives the web W by rotating in response to driving force of a motor with the web W wound around the drive roller 281. The nip roller 282 holds the web W between the nip roller 282 and the drive roller 281.

As described above, the transfer part 2 forms a transfer route of the web W by combining a plurality of rollers and transfers the web W along the transfer route. While a major part of the transfer route is formed in internal space SP inside the housing 100, the transfer route may partially be formed outside the housing 100 in a part corresponding to at least one of the feed roller 21 and the wind-up roller 22. This makes it possible to mount and remove the roll-like web W on and from the feed roller 21 and the wind-up roller 22 with increased workability.

The printer 1 includes a plurality of head units 3 facing the web W from above supported on the support rollers 24 inside the housing 100. As will be described later in detail, each of the head units 3 includes a printing head 30 that ejects ink downward from an ejection port (nozzle) provided at the bottom to make the ink adhere to the web W transferred below the printing head 30. As an example, by causing the printing heads 30 provided at the respective head units 3 to eject inks of different colors, color printing is realized. In this example, six head units 3 are arranged along the transfer route. However, the number of the head units 3 to be provided is not limited to this but can be determined freely. A combination of ink types to be ejected from the respective printing heads 30 can also be determined freely.

Figure 2:
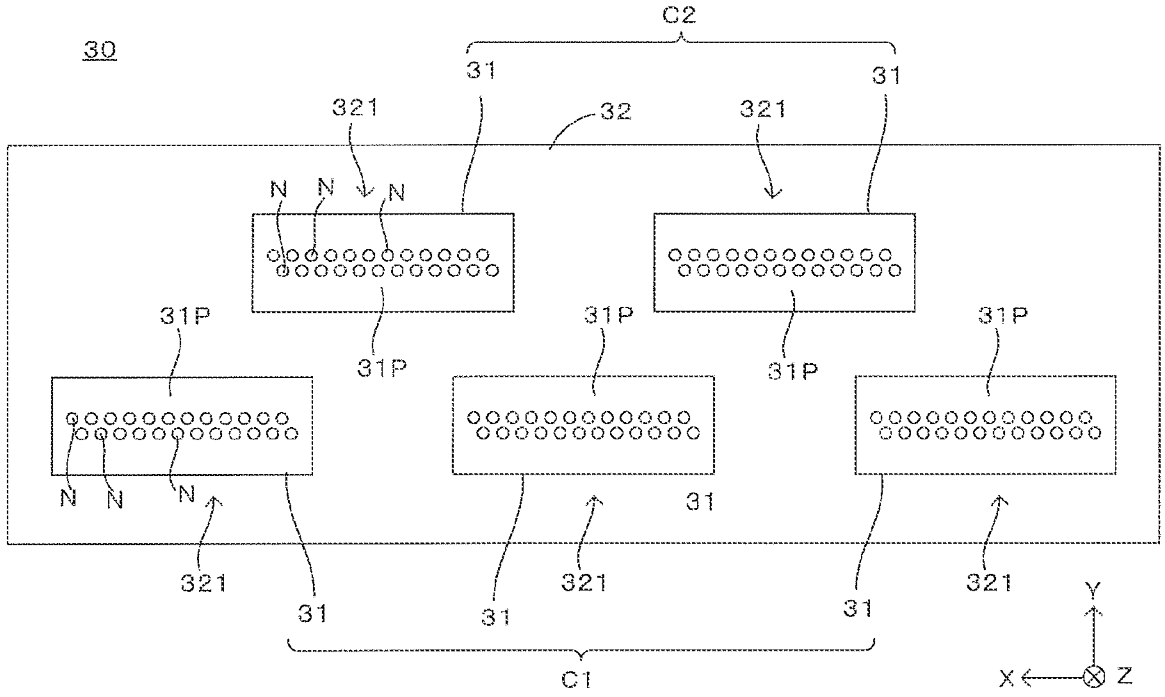
FIG. 2 is a bottom view schematically showing the configuration of the printing head 30.

FIG. 2 is a bottom view schematically showing the configuration of the printing head 30. The printing head 30 includes a plurality of (in this example, five) nozzle blocks 31. The plurality of nozzle blocks 31 are arranged in a so-called staggered pattern in two lines in the X direction. In other words, a nozzle block line C1 with three nozzle blocks 31 arranged parallel to in the X direction and a nozzle block line C2 with two nozzle blocks 31 arranged parallel in the X direction are provided with a predetermined interval therebetween in the Y direction. Each of the nozzle blocks 31 has a nozzle opening plane 31P facing the web W from above. A plurality of nozzles N open at the nozzle opening plane 31P. The plurality of nozzles N are arranged in a staggered pattern in the X direction and eject ink to the web w by the inkjet method. The printing head 30 includes a holding member 32 holding each of the nozzle blocks 31. The holding member 32 has a plurality of insertion holes 321 formed corresponding to the plurality of nozzle blocks 31. The plurality of nozzle blocks 31 are fixed to the holding member 32 while being inserted in the corresponding insertion holes 321 respectively. The holding member 32 can be made of an inelastic material such as metal or resin.

As shown in FIG. 1, the respective postures of the head units 3 are determined in response to the tilt of the web W supported on the support rollers 24. Specifically, the head units 3 are arranged in such a manner that, of a plurality of the head units 3, the head unit 3 located further upstream of the transfer direction of the web W has a greater tilt relative to the Z direction. The head unit 3 located most downstream of the transfer direction of the web W (Y direction) is arranged horizontally and does not tilt relative to the Z direction. The head units 3 other than the most downstream head unit 3 tilt in such a manner as to rise toward the transfer direction of the web W.

A maintenance part 50 is provided to each of the head units 3 in such a manner as to cover a lower part of the printing head 30, as will be described next. The maintenance part plays the role of keeping the nozzle Z of the printing head 30 clean and preventing clogging at the nozzle Z, and maintaining the printing head 30 in a state ready to be available for printing operation promptly in response to need. As shown in FIG. 1, while all the head units 3 are arranged at different tilt angles, the configurations themselves of the head units 3 can basically be the same. For this reason, the head units 3 are not particularly distinguished from each other in the description of the head unit 3 given below.

Figure 3:
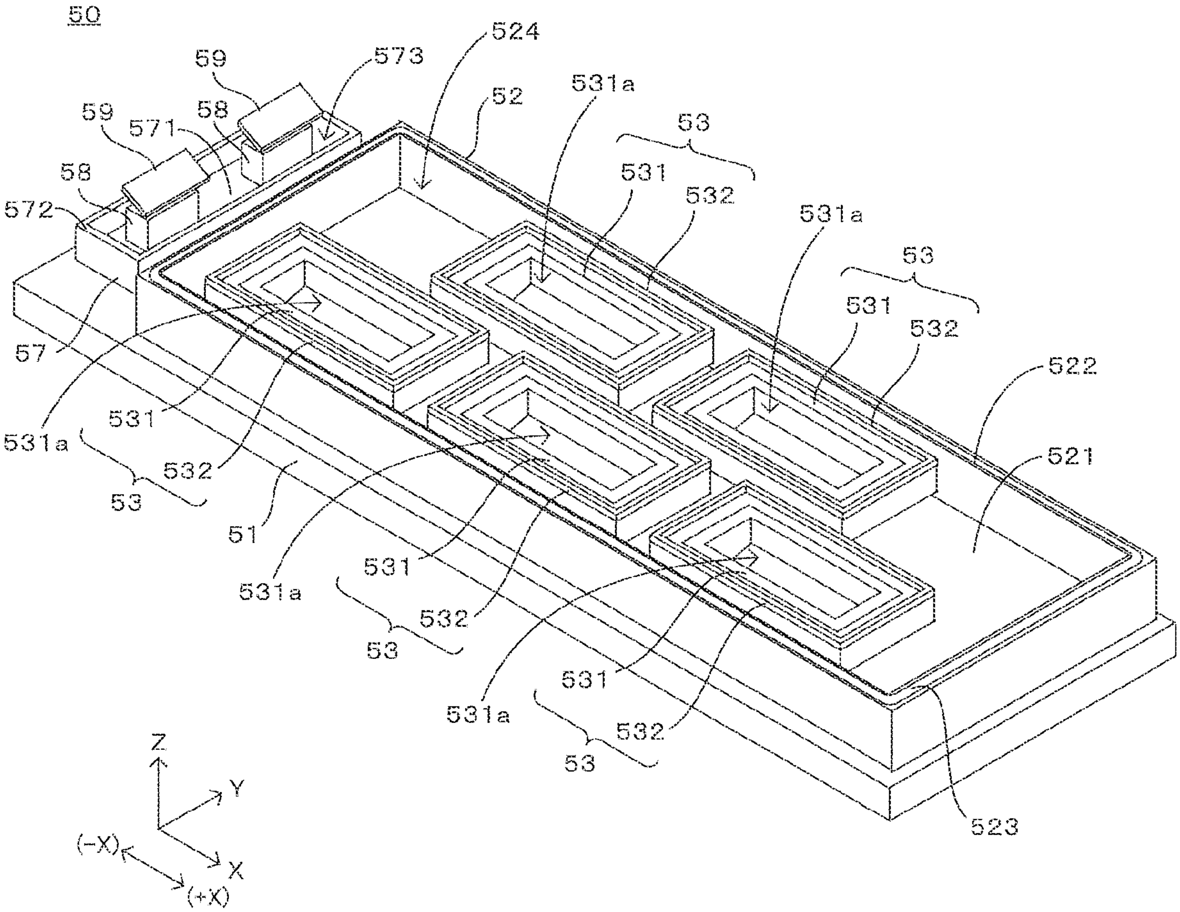
FIG. 3 is a perspective view schematically showing the configuration of the maintenance part 50.
Figure 4A:
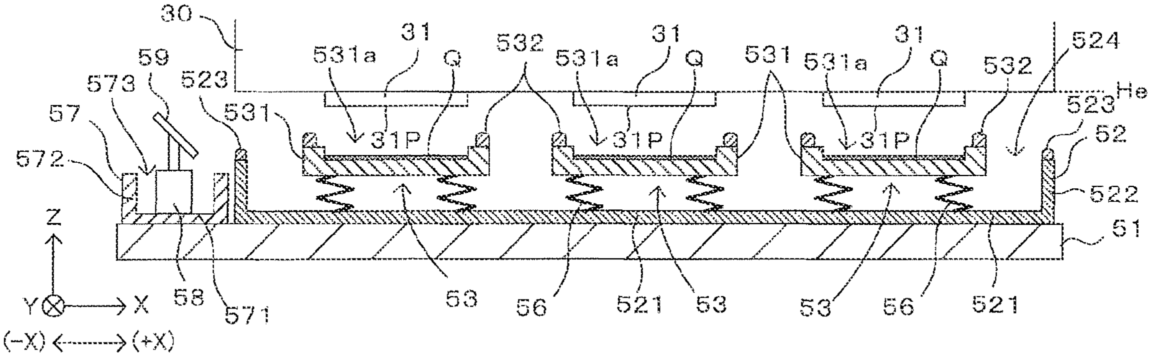
FIG. 4A is a schematic view for explaining the function of the maintenance part 50.
Figure 4B:
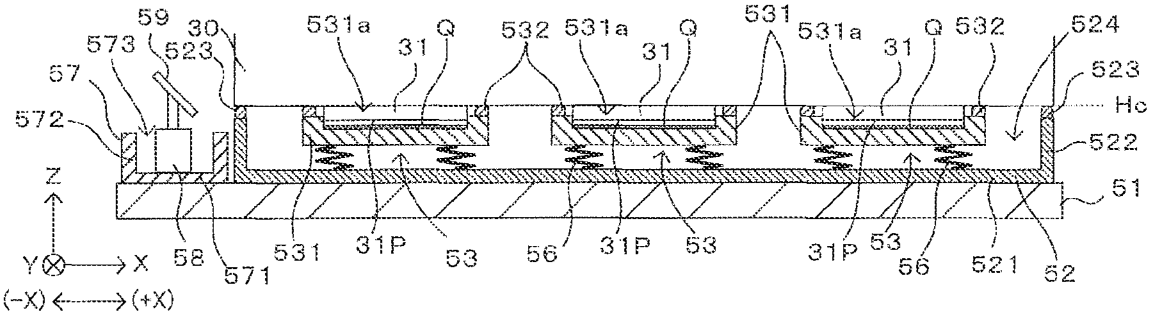
FIG. 4B is a schematic view for explaining the function of the maintenance part 50.
Figure 4C:
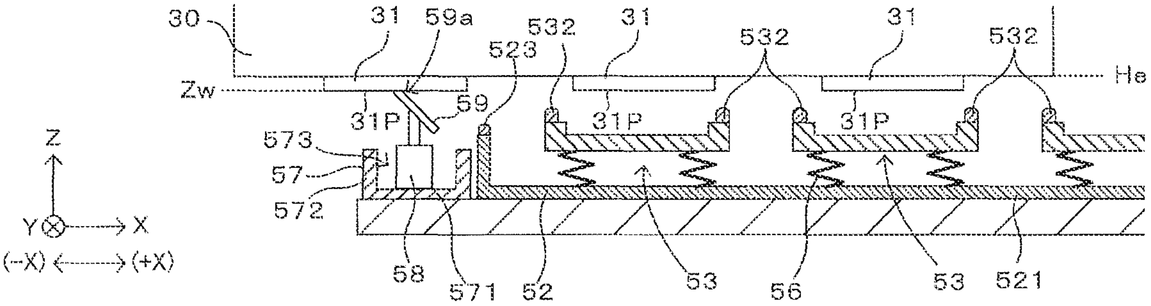
FIG. 4C is a schematic view for explaining the function of the maintenance part 50.

FIG. 3 is a perspective view schematically showing the configuration of the maintenance part 50. FIG. 4 is a schematic view for explaining the function of the maintenance part 50. The maintenance part 50 is shown in its sectional view in FIGS. 4A to 4C. In these drawings and their subsequent drawings, a direction toward the arrow of the X direction is indicated as a (+X) direction and a direction toward the opposite side to the (+X) direction is indicated as a (−X) direction, as appropriate. The maintenance parts 50 are provided to each of head units 3. The configurations of the maintenance part s 50 are common between the head units 3 except the postures of the maintenance parts 50. For this reason, the description given below is intended for one maintenance part 50.

The maintenance part 50 includes a base member 51 having a rectangular solid shape extending long in the X direction. A tray 52 and a tray 57 each having a box shape with an opening top are mounted on the base member 51 in order to receive ink ejected from the printing head 30 or various types of processing liquids. The tray 52 and the tray 57 are arranged in the X direction. The larger tray 52 is arranged toward the (+X) direction relative to the smaller tray 57.

The tray 52 includes a bottom plate 521 having a rectangular shape in a plan view, and a side wall 522 standing upright from a peripheral part of the bottom plate 521. The side wall 522 is a frame body having a rectangular shape in a plan view. An elastic member 523 is mounted on an entire periphery of an upper end of the side wall 522. In this way, a reservoir chamber 524 opening upward surrounded by the bottom plate 521 and the side wall 522 is formed at the tray 52. A plurality of caps 53 are arranged at the bottom plate 521 of the tray 52. The plurality of caps 53 are arranged corresponding to the plurality of nozzle blocks 31 of the printing head 30 respectively and are arranged in a staggered pattern in the X direction. The cap 53 includes a cap body 531 formed into a box shape conforming to an outer shape of the nozzle block 31. The cap body 531 includes a reservoir chamber 531*a* having an opening that opens upward (toward the nozzle block 31). The cap 53 further includes a seal member 532 surrounding the opening of the reservoir chamber 531*a*. The seal member 532 is a member formed into a rectangular ring shape in outline and made of rubber, for example. The maintenance part 50 includes an elastic member 56 provided corresponding to each of the caps 53. The elastic member 56 biases the corresponding cap 53 upward relative to the bottom plate 521 of the tray 52. The elastic member 56 is a compression spring, for example.

As will be described later by referring to FIG. 6, the maintenance part 50 moves in the X direction between a maintenance position Lm facing the printing head 30 from below and a retreat position Le retreating from the maintenance position Lm toward the (+X) direction. While the maintenance part 50 is located at the maintenance position Lm, each of the caps 53 faces the corresponding nozzle block 31 from below as shown in FIG. 4A or 4B. Furthermore, the printing head 30 is configured to be movable in the Z direction relative to the caps 53 of the maintenance part 50. More specifically, the printing head 30 moves in the Z direction between a retreat height He where the printing head 30 is separated from the cap 53 (FIG. 4A or 4C) and a capping height Hc where the printing head 30 abuts on the cap 53 and lower than the retreat height He (FIG. 4B).

As shown in FIG. 4B, by locating the printing head 30 at the capping height Hc, the periphery of each nozzle block 31 is covered with the cap 53. More specifically, while the nozzle block 31 is located inside the seal member 532, the seal member 532 abuts on the printing head 30 (capping). During this capping, the seal member 532 is pressed against the printing head 30 by the biasing force of the elastic member 56 to be deformed elastically. In this way, space surrounding the nozzle block 31 is blocked by the seal member 532 to suppress drying of ink around each nozzle N of the nozzle block 31 (FIG. 2). Furthermore, during implementation of the capping, it is possible to perform a purge process of ejecting ink from each nozzle N. Each of the capping and the purge process is performed while a cleaning liquid Q is pooled in the reservoir chamber 531*a* of the cap 53. Operation of supplying the cleaning liquid Q to the cap 53 will be described later in detail.

The ink or cleaning liquid Q ejected into the cap 53 is discharged through a discharge mechanism not shown in the drawings. Such a mechanism and the purge process realized by this mechanism can be carried out, preferably by applying the contents described in Japanese Patent Application Laid-Open No. 2022-052195 disclosed previously by the present applicant, for example. For this reason, descriptions of the mechanism and the purge process mentioned herein are omitted. In the state of FIG. 4B, the elastic member 523 of the tray 52 abuts on a lower surface of the printing head 30.

The tray 57 includes a bottom plate 571 having a rectangular shape in a plan view, and a side wall 572 standing upright from a peripheral part of the bottom plate 571. The side wall 572 is a frame body having a rectangular shape in a plan view. In this way, a reservoir chamber 573 opening upward surrounded by the bottom plate 571 and the side wall 572 is formed at the tray 57. Two up-down mechanisms 58 arranged in the Y direction are placed on the bottom plate 571 of the tray 57. Furthermore, two wiper blades 59 are provided corresponding to the two up-down mechanisms 58. Each of the up-down mechanisms 58 moves the corresponding wiper blade 59 in the Z direction. The two wiper blades 59 are provided corresponding to the two nozzle block lines C1 and C2. Each wiper blade 59 performs wiping on the nozzle blocks 31 forming a corresponding nozzle block line of the nozzle block lines C1 and C2.

Ways of performing the wiping are common between the two wiper blades 59. For this reason, the description given herein by referring to FIG. 4C is about the wiping by one wiper blade 59. FIG. 4C shows how the wiper blade 59 performs the wiping on the three nozzle blocks 31 belonging to the nozzle block line C1. The printing head 30 is located at the retreat height He. The wiper blade 59 is located by the up-down mechanism 58 at a wiping height Zw for performing the wiping on the nozzle opening plane 31P of the nozzle block 31. An upper end of the wiper blade 59 at the wiping height Zw is slightly above the nozzle opening plane 31P of the nozzle block 31. The cap 53 is separated downward from the printing head 30. In this state, moving the maintenance part 50 in the (+X) direction causes the upper end of the wiper blade 59 to slide on the nozzle opening plane 31P of the nozzle block 31 (wiping). By doing so, ink adhering to the nozzle opening plane 31P is wiped away by the wiper blade 59 to drop into the reservoir chamber 573 of the tray 57. The wiping by the wiper blade 59 is performed on the respective nozzle opening planes 31P of the three nozzle blocks 31 sequentially from upstream of the (+X) direction.

Figure 5A:
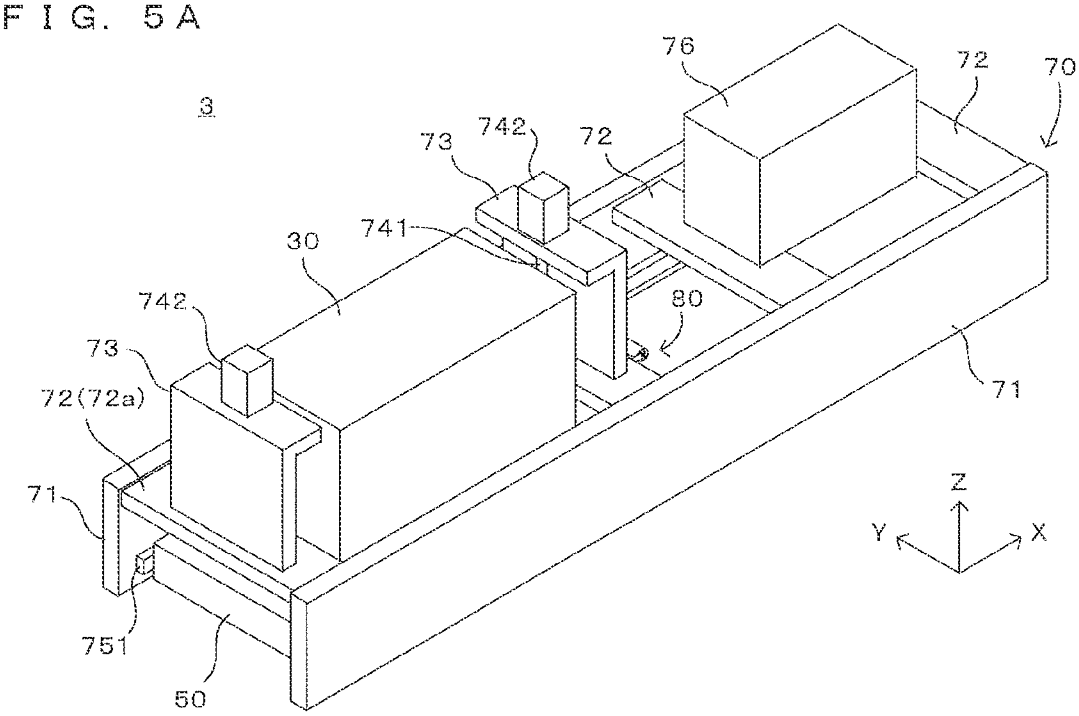
FIG. 5A is a perspective view showing an outer appearance of the head unit 3.
Figure 5B:
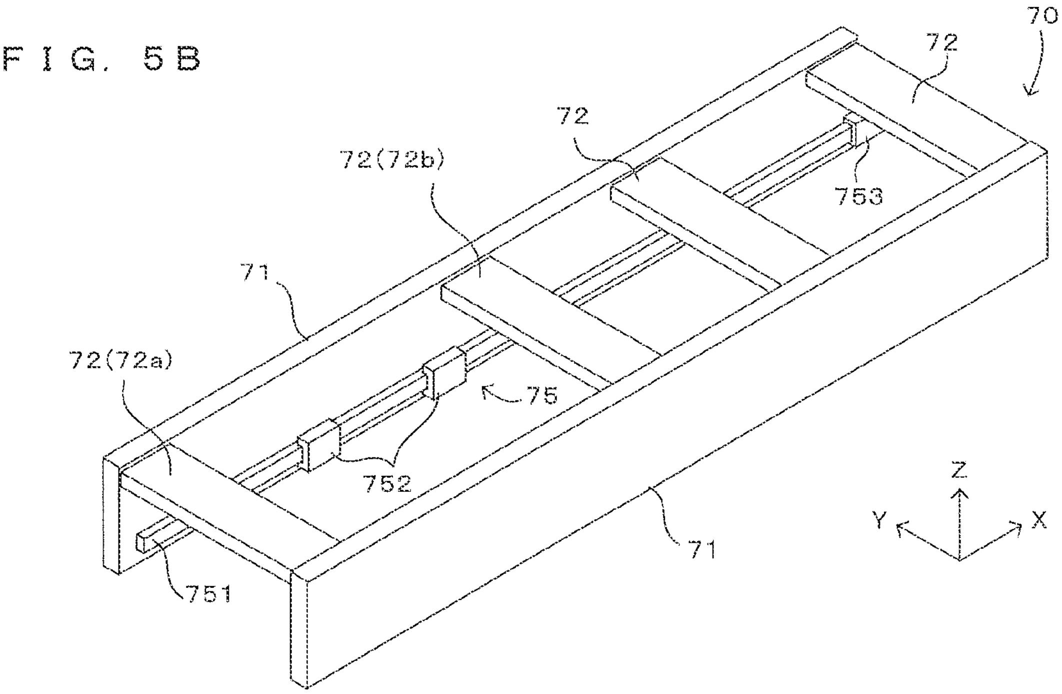
FIG. 5B is an outer perspective view showing a frame 70 of the head unit 3.

The configuration of the head unit 3 will be described in more detail by referring to FIGS. 5 and 6. FIG. 5 is a perspective view showing the configuration of the head unit. More specifically, FIG. 5A is a perspective view showing an outer appearance of the head unit 3. FIG. 5B is an outer perspective view showing a frame 70 of the head unit 3. The head unit 3 has a configuration including various parts mounted on the frame 70 shown in FIG. 5B. To clearly show a frame configuration shielded by these parts, FIG. 5B shows the configuration in a state where some parts are mounted on the frame 70 before integration of major parts into the frame 70. FIG. 6 is a side view showing the configuration and operation of the head unit.

As shown in FIG. 5B, the frame 70 has a configuration including frame members 71 in a pair extending long in the X direction and parallel to each other, and some lateral bridge members 72 extending in the Y direction and connecting the frame members 71 to each other. The shape of the frame members 71, the shape, arrangement, and the number of the lateral bridge members 72, etc. are not limited to those illustrated in the drawings but can be determined freely. As described later, however, as the maintenance part 50 moves back and forth within a range between the frame members 71 facing each other, a configuration not to hinder this movement is desired.

Two lateral bridge members 72 (72*a*, 72*b*) are arranged toward the (−X) direction at the frame members 71 in such a manner as to be separated from each other in the X direction with a predetermined interval therebetween. This interval is greater than the length of the printing head 30 in the X direction. The lateral bridge members 72*a* and 72*b* have respective upper surfaces where head support side plates 73, 73 are mounted for supporting the printing head 30 in a manner allowing the printing head 30 to move up and down.

Figure 6A:
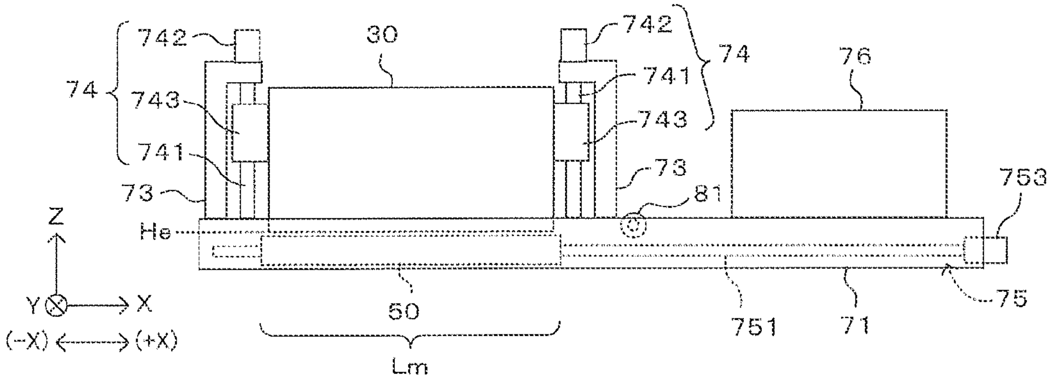
FIG. 6A is a side view showing the configuration and operation of the head unit.
Figure 6B:
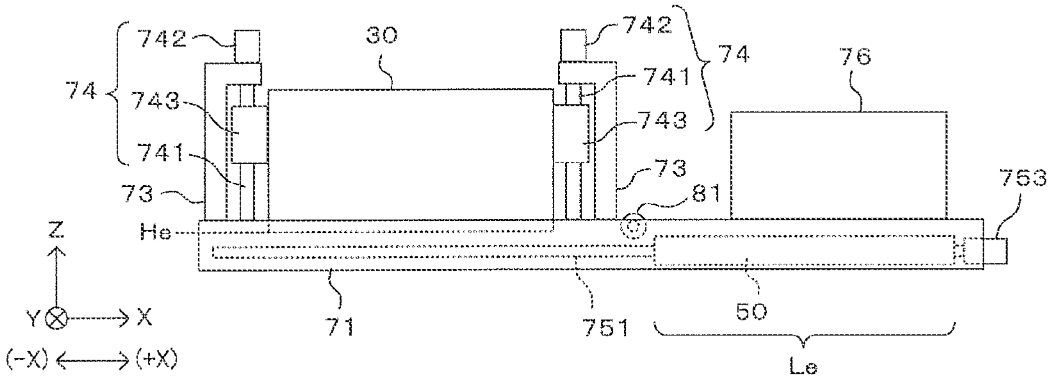
FIG. 6B is a side view showing the configuration and operation of the head unit.
Figure 6C:
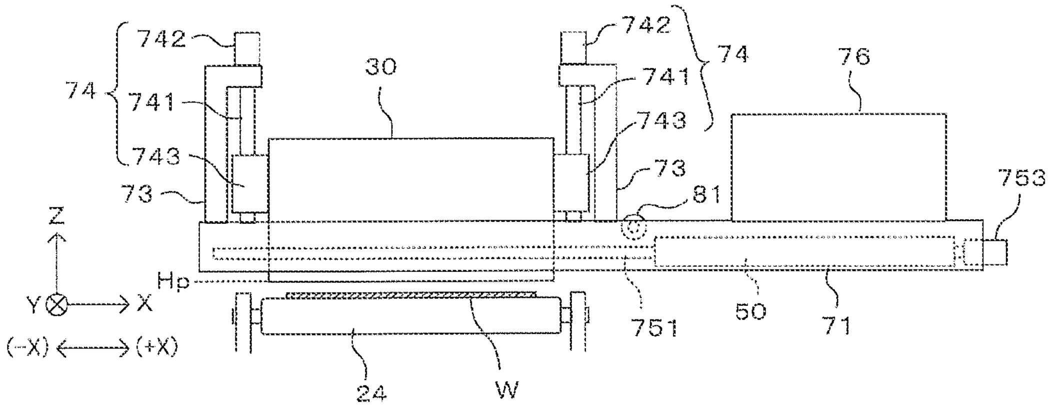
FIG. 6C is a side view showing the configuration and operation of the head unit.

More specifically, as shown in FIG. 6(*a*), the up-down mechanisms 74, 74 are arranged to the head support side plates 73, 73 respectively. The up-down mechanism 74 is a ball screw mechanism, for example, and includes a ball screw 741 extending in a top-bottom direction, a motor 742 that drives the ball screw 741 to rotate, and an up-down block 743 with a nut engaged with the ball screw 741. The up-down block 743 is mounted on each of opposite ends of the printing head 30 in the X direction. Thus, in response to a control command from the control unit 10, the motors 742, 742 rotate in synchronous with each other to move the up-down blocks 743, 743 up and down, thereby moving the printing head 30 up and down relative to the frame members 71.

As shown in FIG. 5B, guide rails 751 extending in the X direction are mounted on respective surfaces of the frame members 71 in a pair facing each other. A slider 752 engages with each of the guide rails 751 movably in the X direction, and a motor 753 coupled to the slider 752 as a drive source driving the slider 752 in the X direction along the guide rail 751. The maintenance part 50 is mounted on the slider 752.

Thus, as shown in FIGS. 6(*a*) and 6(*b*), in response to a control command from the control unit 10, the motors 753 are actuated to move the maintenance part 50 in the X direction along the guide rails 751 in a range between the frame members 71 in a pair. Specifically, the guide rails 751, the sliders 752, and the motors 753 function as a linear-movement mechanism 75 that moves the maintenance part 50 in the X direction. The linear-movement mechanism 75 can be realized using an appropriate mechanism selected appropriately from a linear motor, a ball screw mechanism, an air cylinder, and a belt drive mechanism, for example.

At the head unit 3 having the above-described configuration, the position of the printing head 30 in the Z direction (namely, the height thereof) can be changed by the motor 742. Specifically, the printing head 30 moves in the Z direction between a retreat height He where the printing head 30 has retreated upward from the range of movement of the maintenance part 50 (FIGS. 6(*a*) and 6(*b*)) and a printing height Hp set below the retreat height He where the printing head 30 comes close to the web W (FIG. 6(*c*)). During the printing operation of ejecting ink to the web W for printing on the web W, the printing head 30 is located at the printing height Hp. Meanwhile, during movement of the maintenance part 50 in the X direction, the printing head 30 is located at the retreat height He. As described above by referring to FIG. 4, the printing head 30 is located at the capping height Hc during the capping. Furthermore, driving the maintenance part 50 in the X direction by the motors 753 allows the maintenance part 50 to move between the maintenance position Lm where the maintenance part 50 faces the printing head 30 at the retreat height He from below (FIG. 6(*a*)) and the retreat position Le where the maintenance part 50 has retreated from the maintenance position Lm toward the (+X) direction (FIG. 6(*b*)).

The head unit 3 will be described continuously by referring back to FIG. 5. An electrical component box 76 is mounted on the frame member 71 toward the (+X) direction. The electrical component box 76 stores various types of equipment for operating the head unit 3 properly such as a control circuit for controlling the printing head 30 and the linear-movement mechanism 75, a pump for feeding ink toward the printing head 30, and a power source circuit for supplying power to these components. By mounting the electrical component box 76 including these components and the printing head 30 integrally on the frame member 71, the lengths of pipes or cables leading to the printing head 30 are reduced to achieve stable operation.

The head unit 3 is further provided with a cleaning part 80 arranged toward the (+X) direction relative to the printing head 30. As will be described later, the cleaning part 80 is provided for the purpose of clearing the cap 53 and the wiper blade 59 provided at the maintenance part 50 to remove residual ink adhering to the cap 53 and the wiper blade 59.

Figure 7A:
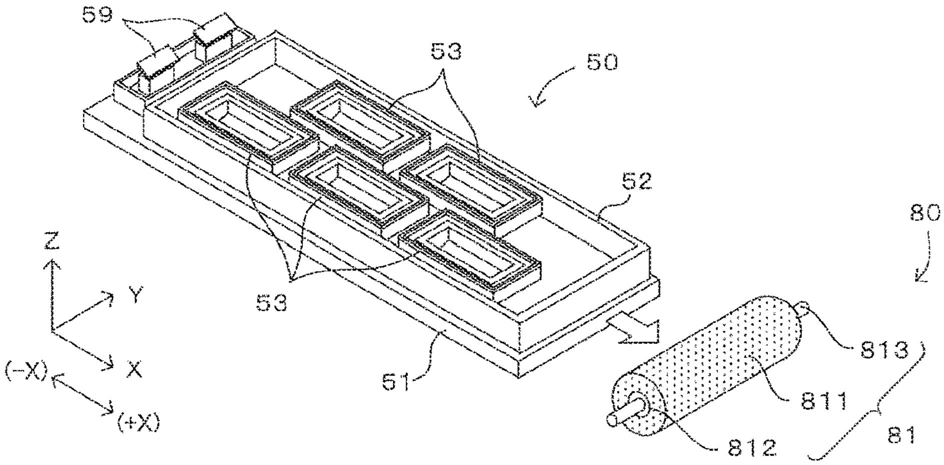
FIG. 7A shows the configuration of the cleaning part 80.
Figure 7B:
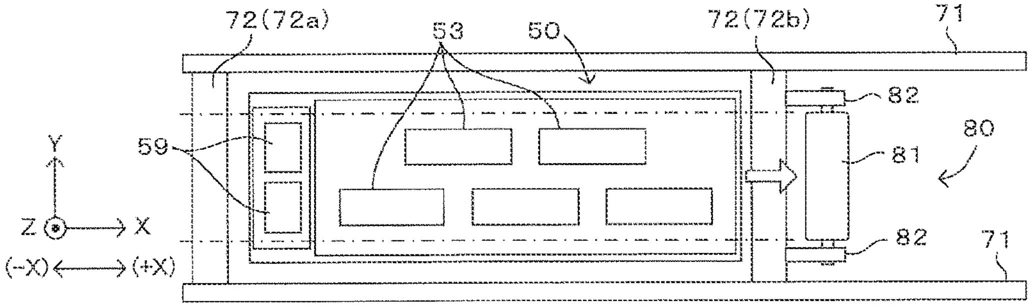
FIG. 7B shows the configuration of the cleaning part 80.
Figure 7C:
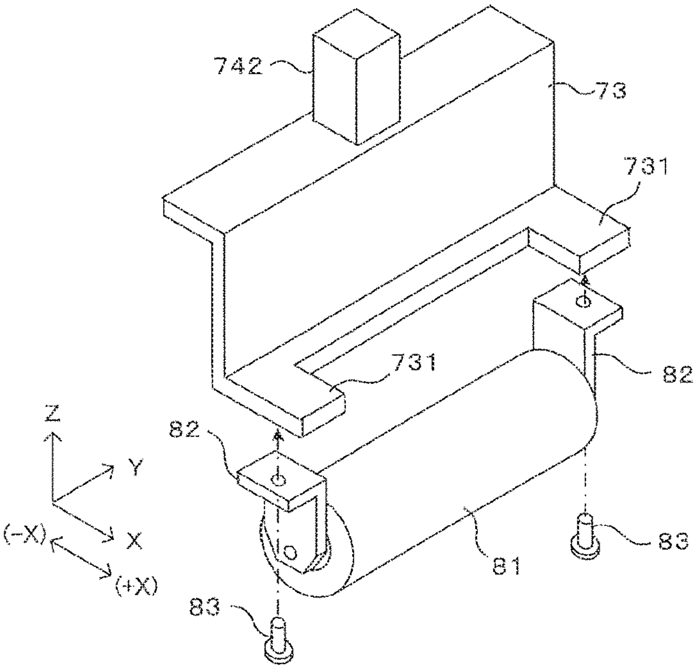
FIG. 7C shows the configuration of the cleaning part 80.

FIG. 7 shows the configuration of the cleaning part 80. As shown in FIGS. 7A and 7B, the cleaning part 80 includes a cleaning roller 81 arranged on a movement route along which the maintenance part 50 moves in the (+X) direction. As indicated by a dashed-dotted line in FIG. 7B, the length of the cleaning roller 81 in the Y direction is set in such a manner as to cover an entire range in the Y direction including the caps 53 and the wiper blades 59 as cleaning targets. Regarding a height direction, the cleaning roller 81 is arranged in such a manner as to overlap paths of respective upper ends of the caps 53 and the wiper blades 59 when the maintenance part 50 moves in the (+X) direction.

The cleaning roller 81 includes a surface layer 811 on its outer peripheral surface. The surface layer 811 is sponge as a porous member, and has liquid retaining property of retaining liquid and elasticity. More specifically, the cleaning roller 81 includes a core 812 made of metal having a cylindrical shape parallel to the Y direction, and the cylindrical surface layer 811 is arranged around the core 812. A rotary shaft 813 is provided coaxially with the center of the core 812, and the rotary shaft 813 has opposite ends rotatably supported by bearing members 82, 82 in a pair. The bearing members 82 are fixed to either the frame member 71 or a member coupled integrally to the frame member 71. In the illustration shown in FIG. 7C, of the head support side plates 73 in a pair, the head support side plate 73 arranged toward the (+X) direction has a side surface toward the (+X) direction where projections 731, 731 in a pair are provided for mounting of the bearing members 82. The bearing members 82, 82 in a pair are fastened to the projections 731, 731 in a pair with fastening members 83 such as screws, for example. In this configuration, the cleaning part 80 moves in the X direction integrally with the printing head 30. Making the fixing member 83 attachable to and removable from the projection 731 facilitates change of the cleaning roller 81 from the head support side plate 73.

Figure 8:
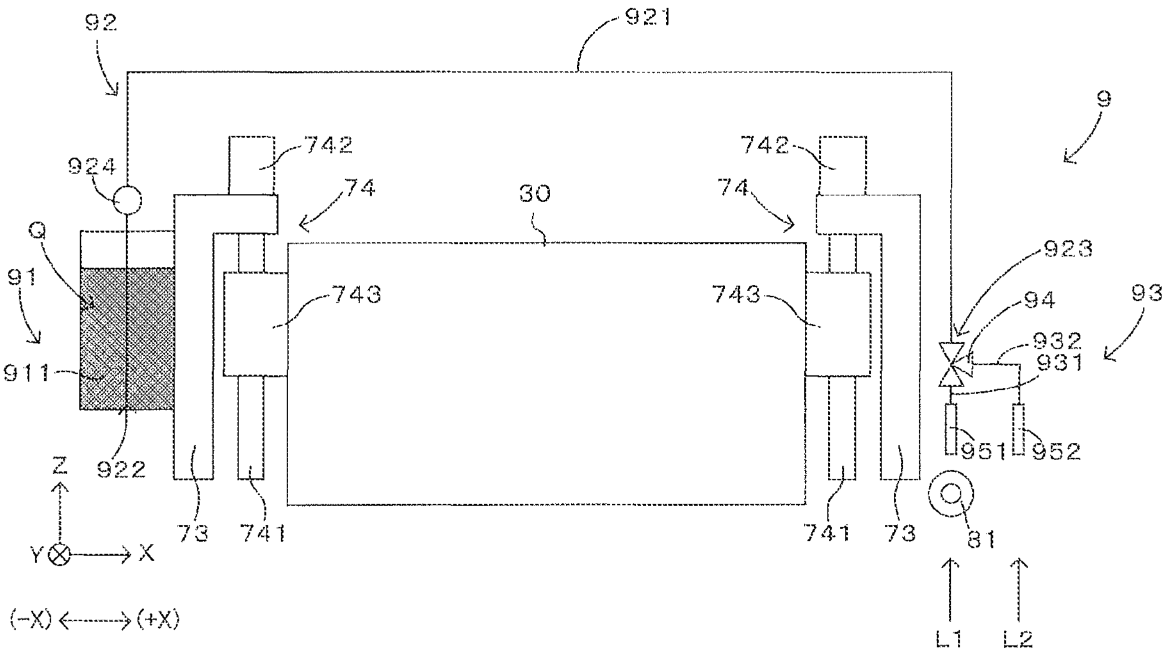
FIG. 8 schematically shows a cleaning liquid supply mechanism 9 configured to supply a cleaning liquid.
Figure 9:
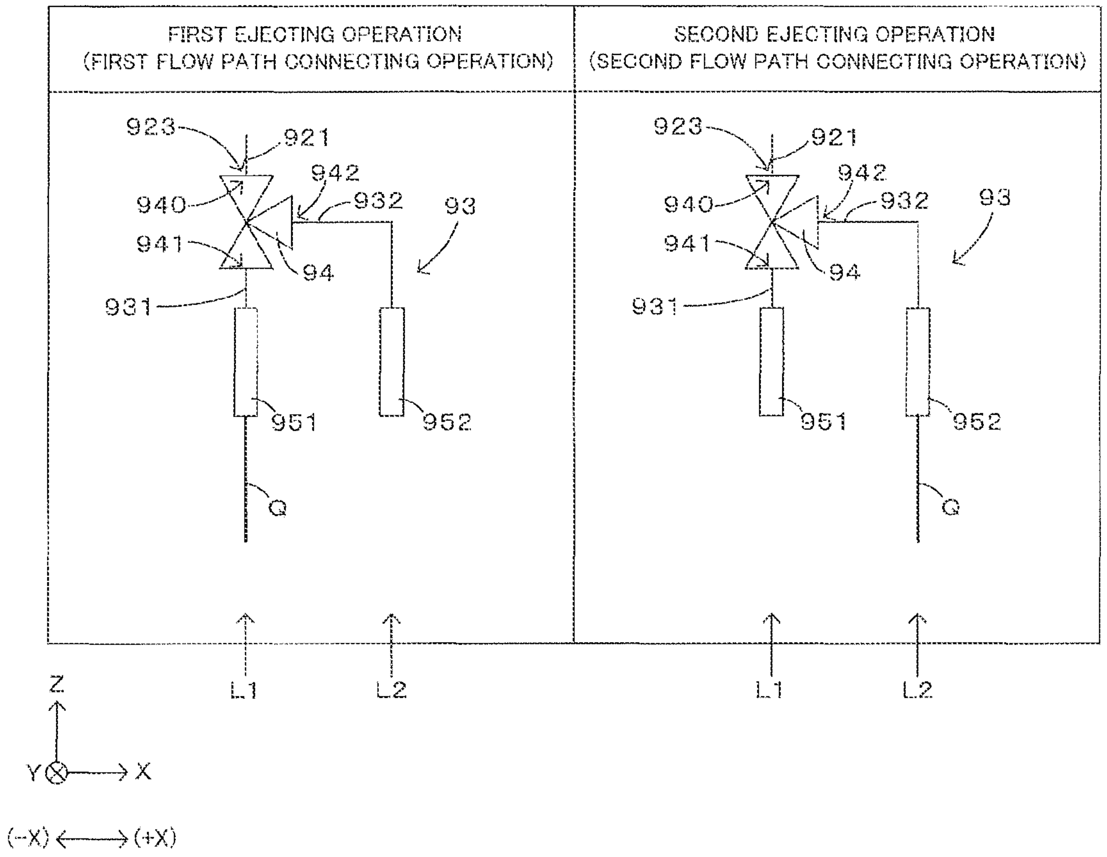
FIG. 9 schematically shows the operation of the cleaning liquid supply mechanism 9 in FIG. 8.
Figure 10A:
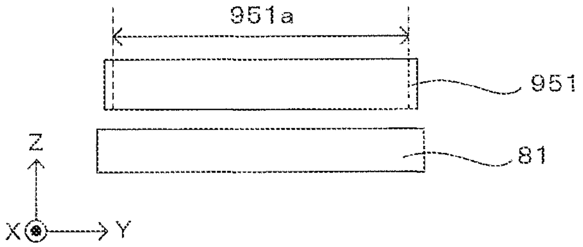
FIG. 10A schematically show the configuration of a cleaning liquid nozzle used for ejecting the cleaning liquid in the cleaning liquid supply mechanism in FIG. 8.
Figure 10B:
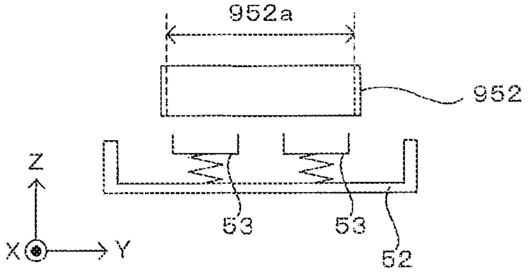
FIG. 10B schematically show the configuration of a cleaning liquid nozzle used for ejecting the cleaning liquid in the cleaning liquid supply mechanism in FIG. 8.

FIG. 8 schematically shows a cleaning liquid supply mechanism 9 configured to supply a cleaning liquid. FIG. 9 schematically shows the operation of the cleaning liquid supply mechanism 9 in FIG. 8. FIGS. 10A and 10B schematically show the configuration of a cleaning liquid nozzle used for ejecting the cleaning liquid in the cleaning liquid supply mechanism in FIG. 8.

The cleaning liquid supply mechanism 9 includes a cleaning liquid reservoir part 91, a liquid feeder 92 that feeds the cleaning liquid Q sucked from the cleaning liquid reservoir part 91, and a cleaning liquid ejector 93 that ejects the cleaning liquid Q having been fed from the cleaning liquid reservoir part 91 by the liquid feeder 92. The cleaning liquid reservoir part 91 includes a reservoir tank 911 arranged toward the (−X) direction relative to the head support side plates 73, 73 in a pair. The cleaning liquid Q is stored in the reservoir tank 911.

The liquid feeder 92 includes a liquid feed pipe 921 extended from a position toward the (−X) direction to a position toward the (+X) direction relative to the head support side plates 73, 73 in a pair. A suction port 922 opens at one end of the liquid feed pipe 921 arranged toward the (−X) direction relative to the head support side plates 73, 73 in a pair. This one end of the liquid feed pipe 921 is inserted in the reservoir tank 911, and the suction port 922 of the liquid feed pipe 921 opens in the cleaning liquid Q stored in the reservoir tank 911. A discharge port 923 opens at the other end of the liquid feed pipe 921 arranged toward the (+X) direction relative to the head support side plates 73, 73 in a pair. The liquid feeder 92 further includes a liquid feed pump 924 mounted on the liquid feed pipe 921. The liquid feed pump 924 drives the cleaning liquid Q in the liquid feed pipe 921 from the suction port 922 toward the discharge port 923. Thus, when the liquid feed pump 924 drives the cleaning liquid Q, the cleaning liquid Q stored in the reservoir tank 911 is sucked from the suction port 922 into the liquid feed pipe 921 and fed to the discharge port 923 through the liquid feed pipe 921.

The cleaning liquid ejector 93 is arranged toward the (+X) direction relative to the head support side plates 73, 73 in a pair. The cleaning liquid ejector 93 includes a solenoid valve 94 mounted on the discharge port 923 of the liquid feed pipe 921. The solenoid valve 94 includes an inflow port 940, a first output port 941, and a second output port 942 (FIG. 9). The discharge port 923 of the liquid feed pipe 921 is mounted on the inflow port 940 of the solenoid valve 94. The solenoid valve 94 selectively performs one of first flow path connecting operation of connecting the inflow port 940 and the first output port 941 to connect flow path between them while disconnecting the inflow port 940 and the second output port 942 and second flow path connecting operation of connecting the inflow port 940 and the second output port 942 to connect flow path between them while disconnecting the inflow port 940 and the first output port 941.

The cleaning liquid ejector 93 includes a pipe 931 having one end connected to the first output port 941 of the solenoid valve 94, and a pipe 932 having one end connected to the second output port 942 of the solenoid valve 94. The cleaning liquid ejector 93 further includes a cleaning liquid nozzle 951 connected to the other end of the pipe 931, and a cleaning liquid nozzle 952 connected to the other end of the pipe 932. The cleaning liquid nozzle 951 faces a first position L1 from above where the cleaning roller 81 is located. The cleaning liquid nozzle 952 faces a second position L2 from above arranged toward the (+X) direction relative to the first position L1.

As shown in FIG. 10A, the cleaning liquid nozzle 951 includes an ejection port 951*a* extended in the Y direction. The ejection port 951*a* faces the first position L1 from above and ejects the cleaning liquid Q to the cleaning roller 81 located at the first position L1. As shown in FIG. 10B, the cleaning liquid nozzle 952 includes an ejection port 952*a* extended in the Y direction. The ejection port 952*a* faces the second position L2 from above and ejects the cleaning liquid Q to the tray 52 and the cap 53 passing through the second position L2. Additionally, the two caps 53 are arranged in the Y direction inside the tray 52 in a side view from the X direction and these two caps 53 are located between opposite ends of the ejection port 952*a* in the Y direction.

In the cleaning liquid supply mechanism 9 described above, when the solenoid valve 94 performs the first flow path connecting operation while the liquid feed pump 924 drives the cleaning liquid Q, the cleaning liquid Q is ejected from the cleaning liquid nozzle 951 toward the first position L1 (first ejecting operation in FIG. 9). In the first ejecting operation, ejection of the cleaning liquid Q from the cleaning liquid nozzle 952 is prohibited by the solenoid valve 94 so the cleaning liquid Q is not ejected from the cleaning liquid nozzle 952. Meanwhile, when the solenoid valve 94 performs the second flow path connecting operation while the liquid feed pump 924 drives the cleaning liquid Q, the cleaning liquid Q is ejected from the cleaning liquid nozzle 952 toward the second position L2 (second ejecting operation in FIG. 9). In the second ejecting operation, ejection of the cleaning liquid Q from the cleaning liquid nozzle 951 is prohibited by the solenoid valve 94 so the cleaning liquid Q is not ejected from the cleaning liquid nozzle 951. In this way, the cleaning liquid supply mechanism 9 can selectively perform one of the first ejecting operation of ejecting the cleaning liquid Q from the cleaning liquid nozzle 951 to the first position L1 and the second ejecting operation of ejecting the cleaning liquid Q from the cleaning liquid nozzle 952 to the second position L2. In other words, the cleaning liquid supply mechanism 9 can switch a destination of ejection of the cleaning liquid Q between the first position L1 and the second position L2 different from each other in the X direction.

Figure 11:
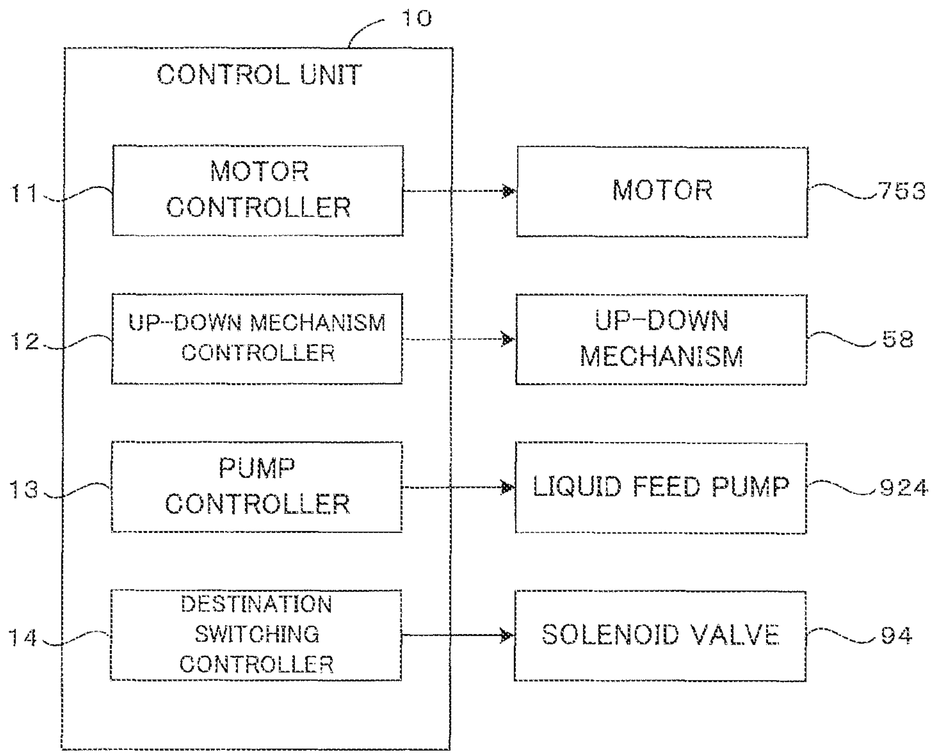
FIG. 11 is a block diagram showing an example of the configuration of the control unit of the printer.

FIG. 11 is a block diagram showing an example of the configuration of the control unit of the printer. The control unit 10 as a processor executes a predetermined program to form each of a motor controller 11, an up-down mechanism controller 12, a pump controller 13, and an ejection destination switching controller 14 in the control unit 10. The motor controller 11 controls the motor 753 that drives the maintenance part 50 in the X direction. The up-down mechanism controller 12 controls the up-down mechanism 58 that drives the wiper blade 59 in the Z direction. The pump controller 13 controls the liquid feed pump 924 that feeds the cleaning liquid Q from the reservoir tank 911 to the cleaning liquid ejector 93. The ejection destination switching controller 14 controls the solenoid valve 94 that switches a destination of ejection of the cleaning liquid Q between the first position L1 and the second position L2.

Figure 12:
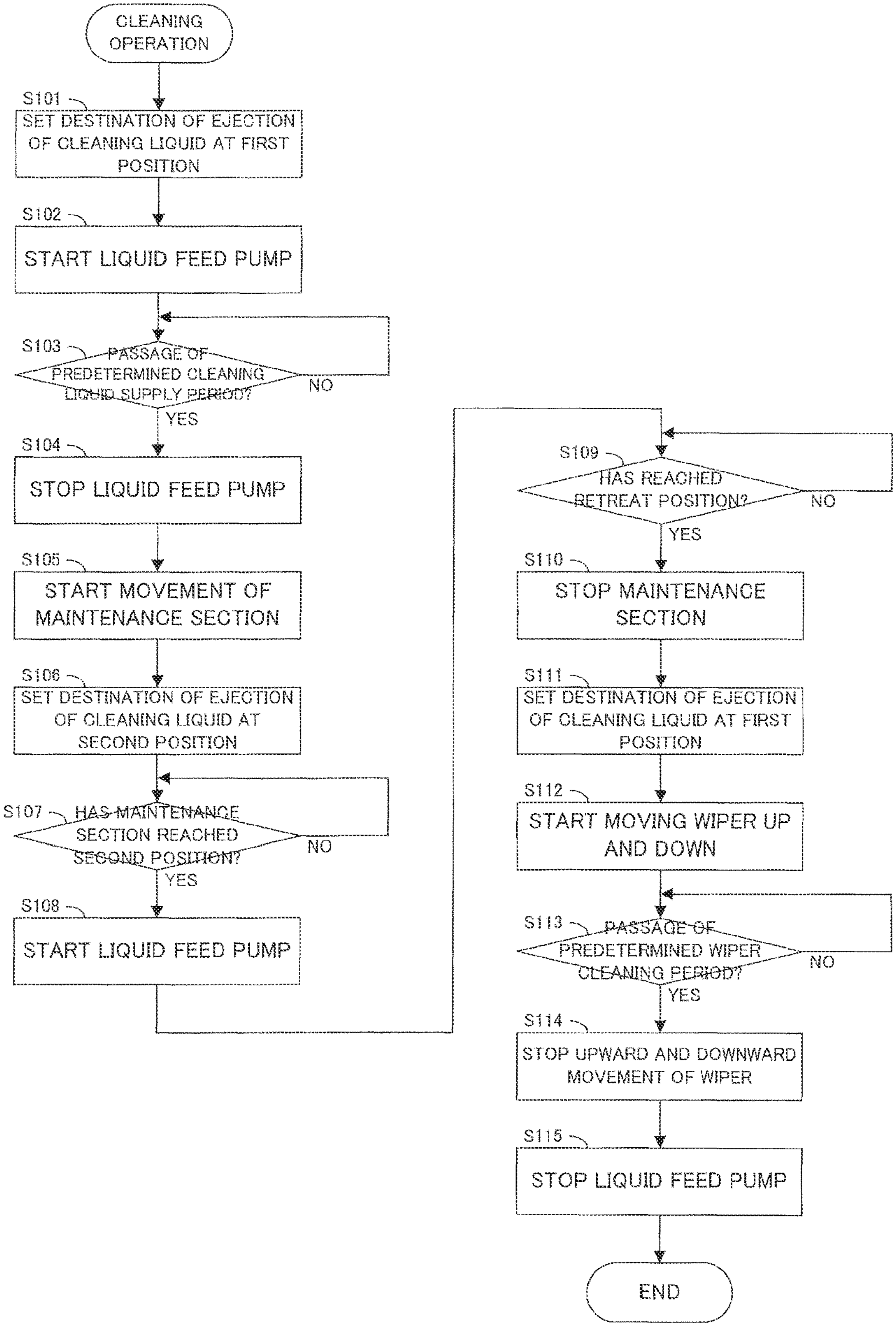
FIG. 12 is a flowchart showing an example of cleaning operation performed in the printer.

FIG. 12 is a flowchart showing an example of cleaning operation performed in the printer. FIGS. 13A to 13H schematically show operations performed in line with the flowchart in FIG. 12. The cleaning operation in FIG. 12 is performed under control by the control unit 10.

Figure 13A:
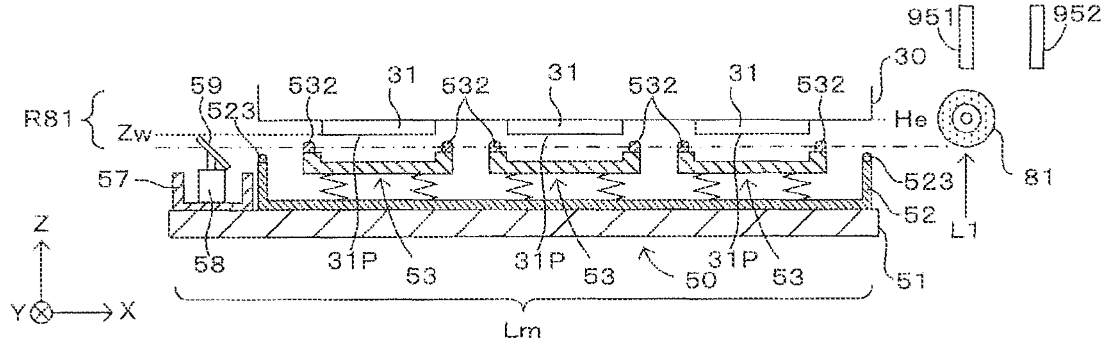
FIGS. 13A to 13H schematically show operations performed in line with the flowchart in FIG. 12.

At the start of the cleaning operation in FIG. 12, the printing head 30 is located at the retreat height He and the maintenance part 50 stops at the maintenance position Lm (FIG. 13A). The cleaning roller 81 is located toward the (+X) direction relative to the maintenance part 50. Furthermore, as indicated by a dashed-dotted line in FIG. 13A, an upper end of the cap 53 (more specifically, an upper end of the seal member 532) and the upper end of the wiper blade 59 are located within a roller contact range R81 between a lower end and an upper end of the surface layer 811 of the cleaning roller 81 in the height direction (Z direction). In particular, the up-down mechanism controller 12 locates the wiper blade 59 at the wiping height Zw by controlling the up-down mechanism 58. The wiping height Zw is defined within the roller contact range R81.

Figure 13B:
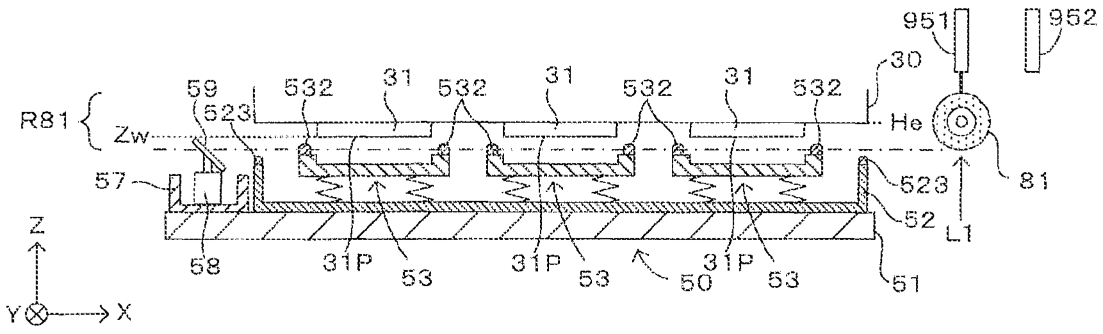

In step S101, the ejection destination switching controller 14 sets a destination of ejection of the cleaning liquid Q at the first position L1 by causing the solenoid valve 94 to perform the first flow path connecting operation. In step S102, the pump controller 13 starts the liquid feed pump 924. By doing so, the cleaning liquid Q having been fed by the liquid feed pump 924 from the reservoir tank 911 to the cleaning liquid ejector 93 is ejected from the cleaning liquid nozzle 951 to the cleaning roller 81 at the first position L1 (FIG. 13B). Next, after passage of a predetermined cleaning liquid supply period ("YES" in step S103), the pump controller 13 stops the liquid feed pump 924 (step S104). By doing so, the ejection of the cleaning liquid Q from the cleaning liquid nozzle 951 to the cleaning roller 81 at the first position L1 is stopped. As described above, the surface layer 811 of the cleaning roller 81 is porous sponge, and has liquid retaining property of retaining liquid. In response to this, the cleaning liquid supply period in step S103 is provided for absorbing and retaining the cleaning liquid Q of a sufficient amount in the surface layer 811.

Figure 13C:
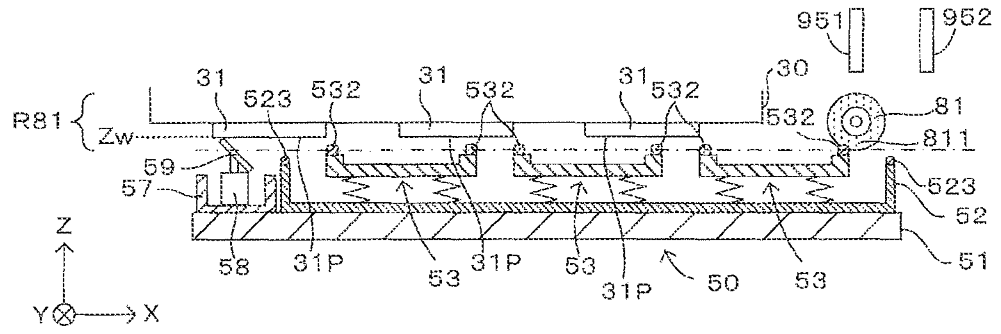

In step S105, the motor controller 11 causes the motor 753 to start movement of the maintenance part 50 from the maintenance position Lm to the retreat position Le. Along with start of the movement of the maintenance part 50 in step S105, the surface layer 811 of the cleaning roller 81 comes into contact with the seal member 532 of the cap 53 moving in the X direction (FIG. 13C, etc.). As the cleaning roller 81 is rotatable about the rotary shaft parallel to the Y direction, the cleaning roller 81 is driven to rotate by the seal member 532 moving in the X direction. In this way, the seal member 532 of the cap 53 is cleaned with the surface layer 811 of the cleaning roller 81 retaining the cleaning liquid Q.

Figure 13D:
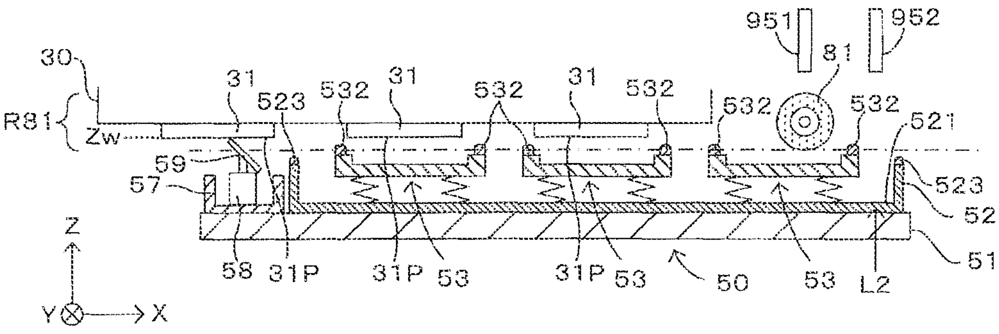

Along with start of the movement of the maintenance part 50 in step S105, wiping is also performed by which the upper end of the wiper blade 59 is caused to slide on the nozzle opening plane 31P in the X direction (FIGS. 13C, 13D, etc.). As a result of the wiping, ink adhering to the nozzle opening plane 31P is wiped away by the wiper blade 59 to drop into the reservoir chamber 573 of the tray 57.

In step S106, the ejection destination switching controller 14 sets a destination of ejection of the cleaning liquid Q at the second position L2 by causing the solenoid valve 94 to perform the second flow path connecting operation. Then, in step S107, it is determined whether the maintenance part 50 has reached the second position L2. In this example, it is determined whether the inside of the tray 52 of the maintenance part 50 (more specifically, the bottom plate 521 of the tray 52) has reached the second position L2. When the inside of the tray 52 reaches the second position L2 ("YES" in step S107), the pump controller 13 starts the liquid feed pump 924 (step S108).

Figure 13E:
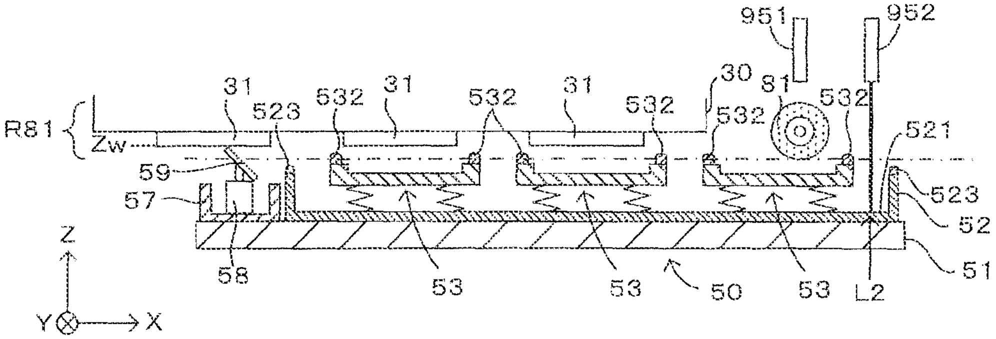

By doing so, the cleaning liquid Q having been fed by the liquid feed pump 924 from the reservoir tank 911 to the cleaning liquid ejector 93 is ejected from the cleaning liquid nozzle 952 to the bottom plate 521 of the tray 52 passing through the second position L2 (FIG. 13E). The cleaning liquid Q ejected in this way to the bottom plate 521 of the tray 52 is pooled in the tray 52. A porous member such as sponge, for example, may be provided at the bottom plate 521 of the tray 52. In this case, the cleaning liquid Q is absorbed and retained by the porous member.

Figure 13F:
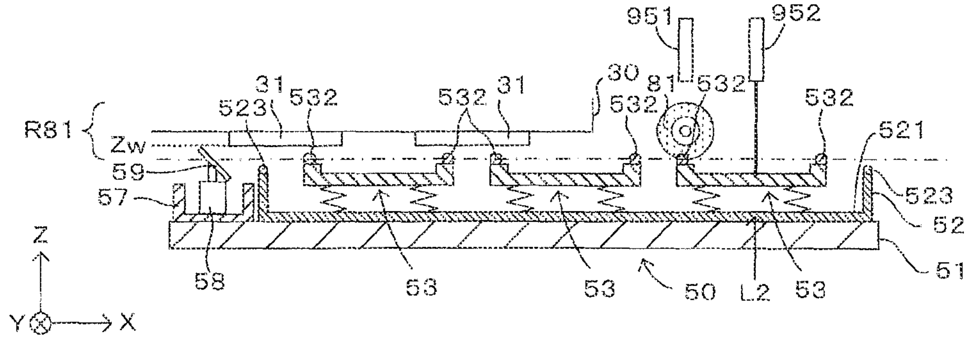

Along with the movement of the maintenance part 50 from the maintenance position Lm toward the retreat position Le, the plurality of caps 53 at the bottom plate 521 of the tray 52 pass through the second position L2 sequentially. In response to this, the cleaning liquid Q from the cleaning liquid nozzle 952 is ejected to the caps 53 passing through the second position L2 (FIG. 13F). By doing so, the cleaning liquid Q is pooled in the reservoir chambers 531*a* of the caps 53 (FIGS. 3, 4).

Figure 13G:
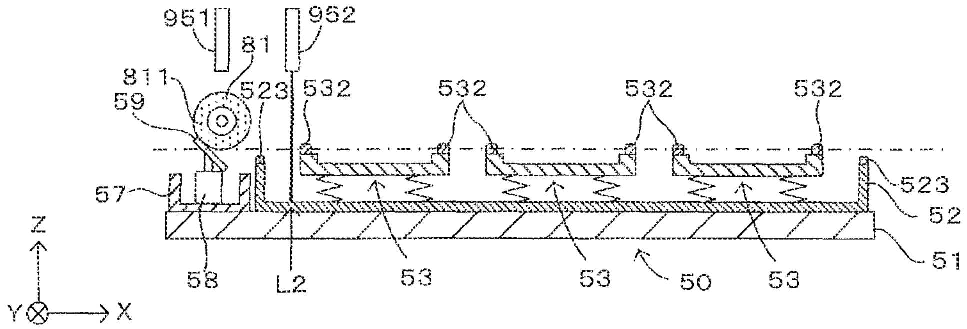

When the maintenance part 50 reaches the retreat position Le ("YES" in step S109), the motor controller 11 causes the motor 753 to stop the maintenance part 50 (step S110). In this way, along with the movement of the maintenance part 50 from steps S105 to S110, the cleaning liquid Q is supplied to the cap 53 and the tray 52. Wiping is also performed along with this movement of the maintenance part 50. Specifically, the upper end of the wiper blade 59 is caused to slide on the respective nozzle opening planes 31P of the plurality of nozzle blocks 31 sequentially, thereby wiping away the ink adhering to each of the nozzle opening planes 31P by the wiper blade 59 and collected in the tray 57 (wiping). As shown in FIG. 13G, when the maintenance part 50 stops at the retreat position Le in step S110, the surface layer 811 of the cleaning roller 81 contacts the wiper blade 59.

Figure 13H:
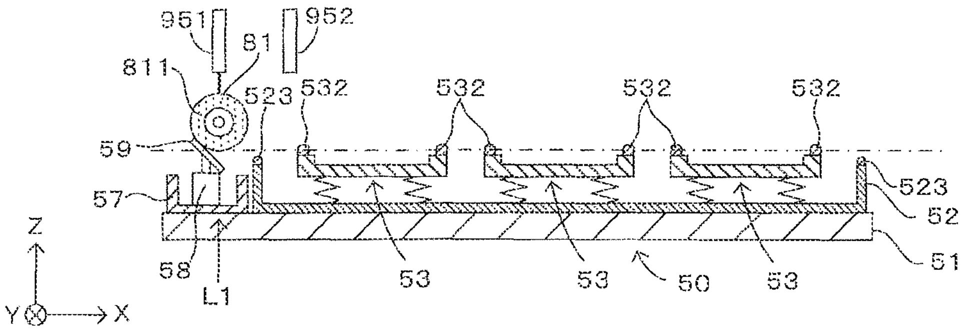

In step S111, the ejection destination switching controller 14 sets a destination of ejection of the cleaning liquid Q at the first position L1 by causing the solenoid valve 94 to perform the first flow path connecting operation. By doing so, the cleaning liquid Q having been fed by the liquid feed pump 924 from the reservoir tank 911 to the cleaning liquid ejector 93 is ejected from the cleaning liquid nozzle 951 to the cleaning roller 81 at the first position L1 (FIG. 13H). By doing so, the cleaning liquid Q is supplied to the surface layer 811 of the cleaning roller 81 and retained in the surface layer 811. The cleaning liquid Q failing to be retained in the surface layer 811 reaches the wiper blade 59 and is then collected in the reservoir chamber 573 of the tray 57.

In step S112, the up-down mechanism controller 12 causes the wiper blade 59 to slide on the surface layer 811 of the cleaning roller 81 by causing the up-down mechanism 58 to move the wiper blade 59 up and down (wiper cleaning). During this wiper cleaning, the upper end of the wiper blade 59 moves up and down within the roller contact range R81 while contacting the cleaning roller 81. After passage of a predetermined wiper cleaning period ("YES" in step S113), the up-down mechanism controller 12 causes the up-down mechanism 58 to stop the upward and downward movement of the wiper blade 59 (step S114) and the pump controller 13 causes the liquid feed pump 924 to stop feeding of the cleaning liquid Q (step S115).

When the cleaning operation in FIG. 12 is finished, the cleaning liquid Q is pooled in the reservoir chamber 531*a* of the cap 53 and in the tray 52 of the maintenance part 50 at the retreat position Le. By moving the maintenance part 50 in this state from the retreat position Le to the maintenance position Lm, it becomes possible to perform the capping or the purge process described above by referring to FIG. 4B.

According to the embodiment having the above-described configuration, the cleaning liquid supply mechanism 9 (cleaning liquid ejection unit) ejects the cleaning liquid Q to an ejection target that is one of the cleaning roller 81 (cleaning member) and the cap 53 (cap member). In particular, the cleaning liquid supply mechanism 9 switches the ejection target between the cap 53 and the cleaning roller 81 and ejects the cleaning liquid Q to the ejection target (first ejecting operation/second ejecting operation). Specifically, if the cap 53 is set as the ejection target, the cleaning liquid Q is ejected from the cleaning liquid supply mechanism 9 directly to the cap 53 as the ejection target (FIG. 13F). If the cleaning roller 81 is set as the ejection target, the cleaning liquid Q is ejected from the cleaning liquid supply mechanism 9 directly to the cleaning roller 81 as the ejection target (FIGS. 13B, 13H). Here, ejecting the cleaning liquid Q from the cleaning liquid supply mechanism 9 directly to the ejection target means that the cleaning liquid Q ejected from the cleaning liquid supply mechanism 9 reaches the ejection target without passing through a member different from the ejection target. In this way, it is possible to supply the clean cleaning liquid Q to each of the cap 53 and the cleaning roller 81.

The motor 753 (driving part) is provided that moves the cap 53 (maintenance part 50) in the X direction (movement direction) relative to the cleaning roller 81 by driving the cap 53. The cap 53 is cleaned by bringing the cleaning roller 81 to which the cleaning liquid Q ejected from the cleaning liquid supply mechanism 9 into contact with the cap 53 that is moved in the X direction by the motor 753. In this configuration, it is possible to clean the cap 53 by the cleaning roller 81 to which the clean cleaning liquid Q ejected.

The cleaning liquid supply mechanism 9 selects a destination of ejection of the cleaning liquid Q from the first position L1 where the cleaning roller 81 is located and the second position L2 different from the first position L1 in the X direction (FIG. 9). The cleaning liquid supply mechanism 9 ejects the cleaning liquid Q to the cleaning roller 81 by ejecting the cleaning liquid Q to the first position L1 (FIGS. 13B, 13H). Meanwhile, the cleaning liquid supply mechanism 9 ejects the cleaning liquid Q to the cap 53 by ejecting the cleaning liquid Q to the second position L2 while the motor 753 locates the cap 53 at the second position L2 (FIG. 13F). In this configuration, a destination of ejection of the cleaning liquid Q is switched between the first position L1 and the second position L2, thereby allowing the clean cleaning liquid Q to be supplied to each of the cap 53 and the cleaning roller 81.

The cleaning liquid supply mechanism 9 includes the liquid feed pipe 921 feeding the cleaning liquid Q, the solenoid valve 94 connected to the liquid feed pipe 921, the cleaning liquid nozzle 951 (first cleaning liquid nozzle) connected to the solenoid valve 94, and the cleaning liquid nozzle 952 (second cleaning liquid nozzle) connected to the solenoid valve 94. The cleaning liquid nozzle 951 faces the first position L1. The cleaning liquid nozzle 952 faces the second position L2. Meanwhile, the solenoid valve 94 is configured to perform the first flow path connecting operation and the second flow path connecting operation selectively (FIG. 9). The first flow path connecting operation is operation of feeding the cleaning liquid Q from the liquid feed pipe 921 to the cleaning liquid nozzle 951 by forming flow path connection between the liquid feed pipe 921 and the cleaning liquid nozzle 951 while disconnecting the liquid feed pipe 921 and the cleaning liquid nozzle 952 from each other. The second flow path connecting operation is operation of feeding the cleaning liquid Q from the liquid feed pipe 921 to the cleaning liquid nozzle 952 by forming flow path connection between the liquid feed pipe 921 and the cleaning liquid nozzle 952 while disconnecting the liquid feed pipe 921 and the cleaning liquid nozzle 951 from each other. The cleaning liquid Q is ejected from the cleaning liquid nozzle 951 to the first position L1 through implementation of the first flow path connecting operation by the solenoid valve 94. The cleaning liquid Q is ejected from the cleaning liquid nozzle 952 to the second position L2 through implementation of the second flow path connecting operation by the solenoid valve 94. In this configuration, the solenoid valve 94 switches a destination of flow path connection to the liquid feed pipe 921 feeding the cleaning liquid Q between the cleaning liquid nozzle 951 and the cleaning liquid nozzle 952, thereby allowing the clean cleaning liquid Q to be supplied to each of the cap 53 and the cleaning roller 81.

The cleaning roller 81 is driven to rotate by the movement of the cap 53 in the X direction. In this configuration, it is possible to clean the cap 53 by the cleaning roller 81 to which the clean cleaning liquid Q ejected.

The cleaning roller 81 includes the surface layer 811 (sponge, liquid retaining member) that retains the cleaning liquid Q by absorbing the cleaning liquid Q. The surface layer 811 cleans the cap 53 by coming into contact with the cap 53. In this configuration, it is possible to clean the cap 53 with the clean cleaning liquid Q retained in the surface layer 811 of the cleaning roller 81.

The cap 53 includes the reservoir chamber 531*a* (reservoir) having an opening that opens toward the printing head 30, and the seal member 532 (peripheral part) provided around the opening of the reservoir chamber 531*a*. During implementation of the capping, while the opening of the reservoir chamber 531*a* faces the nozzle N (ink nozzle), the seal member 532 abuts on the printing head 30 (FIG. 4B). Meanwhile, the cleaning roller 81 cleans the seal member 532 of the cap 53 by coming into contact with the seal member 532 (FIGS. 13C, 13F). The cleaning liquid supply mechanism 9 ejects the cleaning liquid Q to the reservoir chamber 531*a* of the cap 53. In this configuration, it is possible to clean the reservoir chamber 531*a* of the cap 53 with the clean cleaning liquid Q ejected from the cleaning liquid supply mechanism 9 to the reservoir chamber 531*a* and to clean the seal member 532 of the cap 53 with the clean cleaning liquid Q ejected from the cleaning liquid supply mechanism 9 to the cleaning roller 81.

The cap 53 performs the capping while the cleaning liquid Q ejected from the cleaning liquid supply mechanism 9 is pooled in the reservoir chamber 531*a* (FIG. 4B). In this configuration, it is possible to retain moisture at the nozzle N with the cleaning liquid Q pooled in the reservoir chamber 531*a* during the capping.

The cap 53 receives ink, ejected from the nozzle N of the printing head 30 through a purge process, by the reservoir chamber 531*a* pooling the cleaning liquid Q ejected from the cleaning liquid supply mechanism 9. In this configuration, it is possible to suppress the reservoir chamber 531*a* of the cap 53 from contamination caused by ink adhering to a wall surface of the reservoir chamber 531*a* after ejected from the nozzle N.

The wiper blade 59 (wiper) and the motor 753 (wiper slide driving part) are provided. The wiper blade 59 wipes away ink from the printing head 30. The motor 753 causes the wiper blade 59 to slide on the printing head 30 by driving the wiper blade 59 (maintenance part 50). Meanwhile, the cleaning liquid supply mechanism 9 ejects the cleaning liquid Q to the cleaning roller 81 while the motor 753 causes the wiper blade 59 to contact the cleaning roller 81 (specifically, causes the maintenance part 50 to locate at the retreat position Le). The cleaning liquid Q ejected to the cleaning roller 81 reaches the wiper blade 59 through the cleaning roller 81 (FIG. 13H). In this configuration, it is possible to supply the cleaning liquid Q to the wiper blade 59 and clean the wiper blade 59.

The tray 52 is provided that includes the bottom plate 521 on which the caps 53 are arranged. The cleaning liquid Q is ejected to the bottom plate 521 of the tray 52 by ejecting the cleaning liquid Q to the second position L2 with the cleaning liquid supply mechanism 9 while the motor 753 locates the bottom plate 521 of the tray 52 at the second position L2 (FIGS. 13E, 13G). In this configuration, it is possible to supply the clean cleaning liquid Q to the bottom plate 521 of the tray 52.

As described above, in the present embodiment, the printer 1 corresponds to an example of a "printer" of the present invention, the printing head 30 corresponds to an example of a "printing head" of the present invention, the tray 52 corresponds to an example of a "tray" of the present invention, the bottom plate 521 corresponds to an example of a "bottom surface" of the present invention, the cap 53 corresponds to an example of a "cap member" of the present invention, the reservoir chamber 531*a* corresponds to an example of a "reservoir" of the present invention, the seal member 532 corresponds to an example of a "peripheral part" of the present invention, the wiper blade 59 corresponds to an example of a "wiper" of the present invention, the motor 753 corresponds to an example of a "driving part" of the present invention, the motor 753 corresponds to an example of a "wiper slide driving part" of the present invention, the cleaning roller 81 corresponds to an example of a "cleaning roller" of the present invention, the cleaning roller 81 corresponds to an example of a "cleaning member" of the present invention, the surface layer 811 corresponds to an example of a "liquid retaining member" of the present invention, the cleaning liquid supply mechanism 9 corresponds to an example of a "cleaning liquid ejection unit" of the present invention, the liquid feed pipe 921 corresponds to an example of a "liquid feed pipe" of the present invention, the solenoid valve 94 corresponds to an example of a "solenoid valve" of the present invention, the cleaning liquid nozzle 951 corresponds to an example of a "first cleaning liquid nozzle" of the present invention, the cleaning liquid nozzle 952 corresponds to an example of a "second cleaning liquid nozzle" of the present invention, the first position L1 corresponds to an example of a "first position" of the present invention, the second position L2 corresponds to an example of a "second position" of the present invention, the nozzle N corresponds to an example of an "ink nozzle" of the present invention, the cleaning liquid Q corresponds to an example of a "cleaning liquid" of the present invention, and the X direction corresponds to an example of a "movement direction" of the present invention.

The present invention is not limited to the above-described embodiment but various changes other than the matter described above can be made within a range not deviating from the purport of the invention. For example, the configuration of the cleaning liquid ejector 93 that changes a destination of ejection of the cleaning liquid Q between the first position L1 and the second position L2 is not limited to the example using the solenoid valve 94 shown in FIG. 9.

Figure 14:
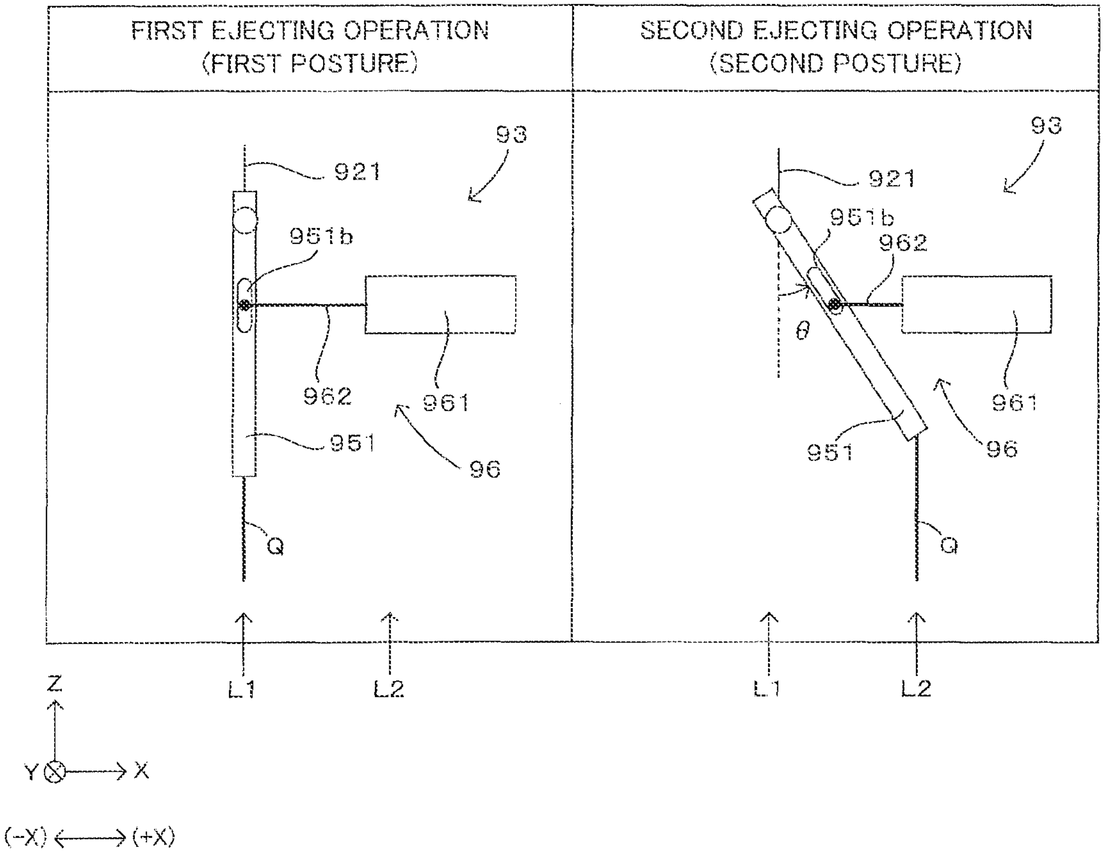
FIG. 14 schematically shows a first modification of the cleaning liquid ejector.

FIG. 14 schematically shows a first modification of the cleaning liquid ejector. In the cleaning liquid ejector 93 in FIG. 14, the single cleaning liquid nozzle 951 is connected to the liquid feed pipe 921 to form flow connection between them. Thus, the cleaning liquid Q having been fed from the reservoir tank 911 through the liquid feed pipe 921 by the liquid feed pump 924 is ejected from the cleaning liquid nozzle 951.

The cleaning liquid nozzle 951 is supported rotatably in a rotary direction about a rotary axis parallel to the Y direction. Meanwhile, the cleaning liquid ejector 93 includes a nozzle driving part 96 that drives the cleaning liquid nozzle 951 in the rotary direction. The nozzle driving part 96 includes an actuator 961, and a rod 962 that is driven in the X direction by the actuator 961. The cleaning liquid nozzle 951 has a peripheral surface where an engagement long hole 951*b* is provided. A tip of the rod 962 is engaged in the engagement long hole 951*b*. Thus, the nozzle driving part 96 is configured to change the posture of the cleaning liquid nozzle 951 between a first posture and a second posture rotated by an angle θ from the first posture by driving the cleaning liquid nozzle 951. The cleaning liquid Q is ejected from the cleaning liquid nozzle 951 in the first posture to the first position L1. The cleaning liquid Q is ejected from the cleaning liquid nozzle 951 in the second posture to the second position L2. Driving of the cleaning liquid nozzle 951 by the nozzle driving part 96 is controlled by the ejection destination switching controller 14.

According to the first modification, the cleaning liquid supply mechanism 9 includes the cleaning liquid nozzle 951 ejecting the cleaning liquid Q, and the nozzle driving part 96 (posture changer) that changes the posture of the cleaning liquid nozzle 951 between the first posture and the second posture. The cleaning liquid nozzle 951 at the first posture ejects the cleaning liquid Q going toward the first position L1. The cleaning liquid nozzle 951 at the second posture ejects the cleaning liquid Q going toward the second position L2. The nozzle driving part 96 locates the cleaning liquid nozzle 951 in the first posture to eject the cleaning liquid Q from the cleaning liquid nozzle 951 to the first position L1. The nozzle driving part 96 locates the cleaning liquid nozzle 951 in the second posture to eject the cleaning liquid Q from the cleaning liquid nozzle 951 to the second position L2. In this configuration, the nozzle driving part 96 switches the posture of the cleaning liquid nozzle 951 ejecting the cleaning liquid Q between the first posture and the second posture, thereby allowing the clean cleaning liquid Q to be supplied to each of the cap 53 and the cleaning roller 81.

Figure 15:
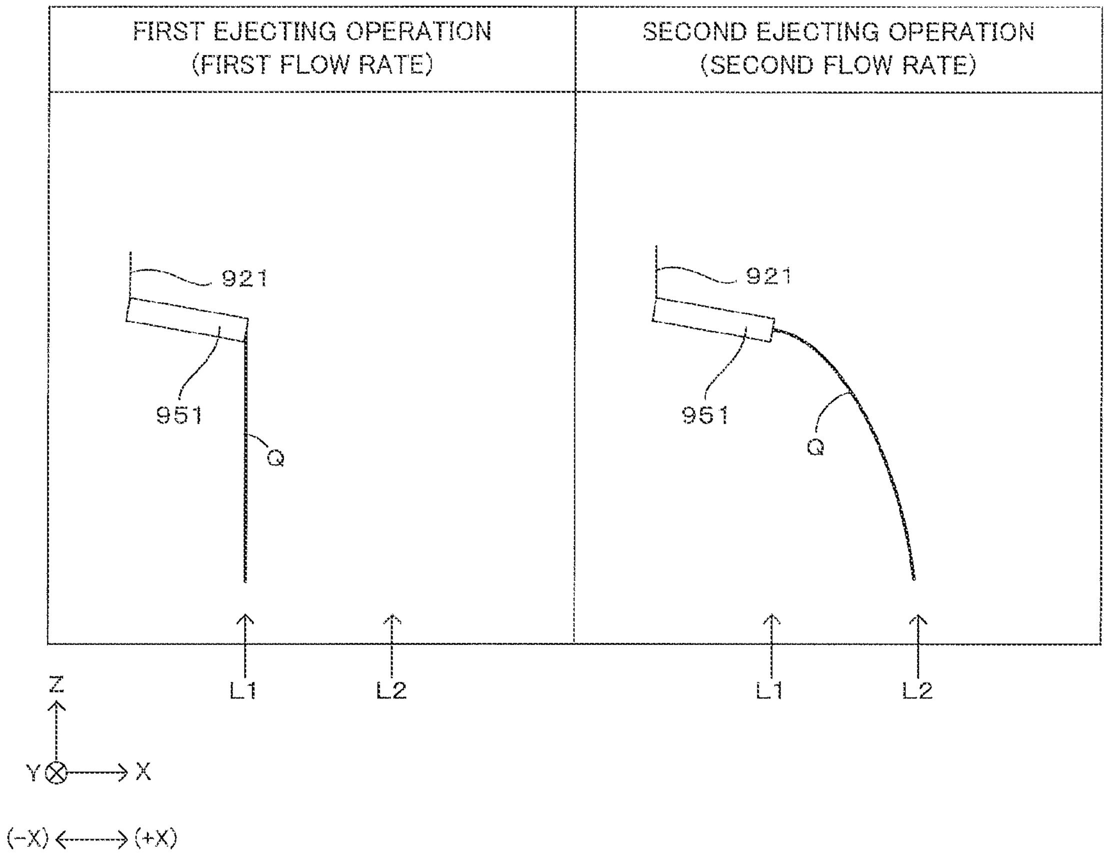
FIG. 15 schematically shows a second modification of the cleaning liquid ejector.

FIG. 15 schematically shows a second modification of the cleaning liquid ejector. In the cleaning liquid ejector 93 in FIG. 15, the single cleaning liquid nozzle 951 is connected to the liquid feed pipe 921 to connect flow path between them. Thus, the cleaning liquid Q having been fed from the reservoir tank 911 through the liquid feed pipe 921 by the liquid feed pump 924 is ejected from the cleaning liquid nozzle 951.

The pump controller 13 causes the liquid feed pump 924 to change the flow rate of the cleaning liquid Q to be ejected from the cleaning liquid nozzle 951 between a first flow rate and a second flow rate. The cleaning liquid Q ejected from the cleaning liquid nozzle 951 at the first flow rate reaches the first position L1. The cleaning liquid Q ejected from the cleaning liquid nozzle 951 at the second flow rate reaches the second position L2.

According to the second modification, the cleaning liquid supply mechanism 9 includes the cleaning liquid nozzle 951 ejecting the cleaning liquid Q, and the liquid feed pump 924 (flow rate changer) that changes the flow rate of the cleaning liquid Q to be ejected from the cleaning liquid nozzle 951 between the first flow rate and the second flow rate. The cleaning liquid Q ejected from the cleaning liquid nozzle 951 at the first flow rate goes toward the first position L1. The cleaning liquid Q ejected from the cleaning liquid nozzle 951 at the second flow rate goes toward the second position L2. The liquid feed pump 924 eject the cleaning liquid Q from the cleaning nozzle at the first flow rate to eject the cleaning liquid Q from the cleaning liquid nozzle 951 to the first position L1. The liquid feed pump 924 eject the cleaning liquid Q from the cleaning nozzle at the second flow rate to eject the cleaning liquid Q from the cleaning liquid nozzle 951 to the second position L2. In this configuration, the liquid feed pump 924 switches the flow rate of the cleaning liquid Q to be ejected from the cleaning liquid nozzle 951 between the first flow rate and the second flow rate, thereby allowing the clean cleaning liquid Q to be supplied to each of the cap 53 and the cleaning roller 81.

A particular configuration of the cleaning member that cleans the cap 53 can be changed, as appropriate. Specifically, the cleaning roller 81 may be replaced with a brush (liquid retaining member) capable of retaining the cleaning liquid Q ejected from the cleaning liquid ejector 93.

A particular configuration for moving the maintenance part 50 relatively in the X direction relative to the cleaning roller 81 is not limited to that described above. Specifically, instead of driving the maintenance part 50 in the X direction, the cleaning roller 81 may be driven in the X direction. Namely, the cleaning roller 81 and the maintenance part 50 can be moved relative to each other by driving at least one of the cleaning roller 81 and the maintenance part 50.

A relationship between a flow rate at which the cleaning liquid Q is ejected to the first position L1 and a flow rate at which the cleaning liquid Q is ejected to the second position L2 can be determined appropriately. Specifically, thinkable variations are such that the former and the latter are equal to each other, the former is less than the latter, and the former is greater than the latter. In particular, setting a flow rate at which the cleaning liquid Q is ejected to the first position L1 less than a flow rate at which the cleaning liquid Q is ejected to the second position L2 brings the following advantage. The cleaning liquid Q is ejected at a low flow rate to the cleaning roller 81 located at the first position L1. It is possible to suppress amount of consumption of the cleaning liquid Q from increase caused by a situation where a flow rate at which the cleaning liquid Q is ejected to the cleaning roller 81 becomes excessive for a speed at which the cleaning roller 81 absorbs the cleaning liquid Q to make much of the cleaning liquid Q drop without being retained by the cleaning roller 81. Furthermore, as the cleaning liquid Q is ejected at a high flow rate to the cap 53 or the tray 52 at the second position L2, it is possible to supply the cap 53 and the tray 52 promptly with the cleaning liquid Q of a sufficient amount.

The cleaning roller 81 may be configured to move in the Z direction (namely, to move up and down) together with the printing head 30 to be driven by the motor 742. In this configuration, the operation of causing the wiper blade 59 to slide on the cleaning roller 81 in step S113 may be performed by moving the cleaning roller 81 up and down. Alternatively, the wiper blade 59 may be caused to slide on the cleaning roller 81 by moving the wiper blade 59 up and down using the up-down mechanism 58 and also moving the cleaning roller 81 up and down using the motor 742.

The particular configuration of the cleaning liquid supply mechanism 9 can be changed, as appropriate. For example, the cleaning liquid reservoir part 91 may be arranged toward the (+X) direction relative to the printing head 30, not toward the (−X) direction relative to the printing head 30.

Two cleaning liquid nozzles 952 may be provided corresponding to the two caps 53 arranged in the Y direction (FIG. 10B). In this case, each of the cleaning liquid nozzles 952 faces the corresponding cap 53 from above and ejects the cleaning liquid Q to the corresponding cap 53. The cleaning liquid Q can be ejected to the bottom plate 521 of the tray 52 by each of the two cleaning liquid nozzles 952.

Timing of implementation of each operation performed during the cleaning operation in FIG. 12 can be changed, as appropriate. For example, movement of the maintenance unit 50 may be started in step S105 before the liquid feed pump is stopped in step S104. Furthermore, a destination of ejection may be set at the second position L2 in step S106 after it is determined in step S107 that the inside of the maintenance part 50 has reached the second position L2. Timing of implementation of other operation may be changed in response to need.

The present invention is applicable to every technique of supplying a cleaning liquid to a cap member that performs capping of abutting on a printing head that ejects ink from an ink nozzle while the cap member faces the ink nozzle and to a cleaning member that cleans the cap member by coming into contact with the cap member.

The printer according may further comprises: a driving part that moves the cap member relatively in a predetermined movement direction relative to the cleaning member by driving at least one of the cleaning member and the cap member, wherein the cleaning member to which the cleaning liquid is ejected from the cleaning liquid ejection unit comes into contact with the cap member that is moved relatively in the movement direction by the driving part to clean the cap member. In this configuration, it is possible to clean the cap member by the cleaning member to which the clean cleaning liquid ejected.

The printer may be configured so that the cleaning liquid ejection unit is configured to select a destination of ejection of the cleaning liquid from a first position where the cleaning member is located and a second position different from the first position in the movement direction, the cleaning liquid ejection unit ejects the cleaning liquid to the cleaning member by ejecting the cleaning liquid to the first position, and the cleaning liquid ejection unit ejects the cleaning liquid to the cap member by ejecting the cleaning liquid to the second position while the driving part locates the cap member at the second position. In this configuration, a destination of ejection of the cleaning liquid is switched between the first position where the cleaning member is located and the second position different from the first position in the movement direction, thereby allowing the clean cleaning liquid to be supplied to each of the cap member and the cleaning member.

The printer may be configured so that the cleaning liquid ejection unit includes a liquid feed pipe feeding the cleaning liquid, a solenoid valve connected to the liquid feed pipe, a first cleaning liquid nozzle connected to the solenoid valve, and a second cleaning liquid nozzle connected to the solenoid valve, the first cleaning liquid nozzle faces the first position, the second cleaning liquid nozzle faces the second position, the solenoid valve is configured to perform first flow path connecting operation and second flow path connecting operation selectively, the first flow path connecting operation being operation of feeding the cleaning liquid from the liquid feed pipe to the first cleaning liquid nozzle by forming flow path connection between the liquid feed pipe and the first cleaning liquid nozzle while disconnecting the liquid feed pipe and the second cleaning liquid nozzle from each other, the second flow path connecting operation being operation of feeding the cleaning liquid from the liquid feed pipe to the second cleaning liquid nozzle by forming flow path connection between the liquid feed pipe and the second cleaning liquid nozzle while disconnecting the liquid feed pipe and the first cleaning liquid nozzle from each other, the solenoid valve performs the first flow path connecting operation to eject the cleaning liquid from the first cleaning liquid nozzle to the first position, and the solenoid valve performs the second flow path connecting operation to eject the cleaning liquid from the second cleaning liquid nozzle to the second position. In this configuration, the solenoid valve switches between the first cleaning liquid nozzle and the second cleaning liquid nozzle as a destination of flow path connection to the liquid feed pipe feeding the cleaning liquid, thereby allowing the clean cleaning liquid to be supplied to each of the cap member and the cleaning member.

The printer may be configured so that the cleaning liquid ejection unit includes a cleaning liquid nozzle ejecting the cleaning liquid, and a posture changer that changes the posture of the cleaning liquid nozzle between a first posture in which the cleaning liquid nozzle ejects the cleaning liquid going toward the first position and a second posture in which the cleaning liquid nozzle ejects the cleaning liquid going toward the second position, the posture changer locates the cleaning liquid nozzle in the first posture to eject the cleaning liquid from the cleaning liquid nozzle to the first position, and the posture changer locates the cleaning liquid nozzle in the second posture to eject the cleaning liquid from the cleaning liquid nozzle to the second position. In this configuration, the posture changer switches the posture of the cleaning liquid nozzle ejecting the cleaning liquid between the first posture and the second posture, thereby allowing the clean cleaning liquid to be supplied to each of the cap member and the cleaning member.

The printer may be configured so that the cleaning liquid ejection unit includes a cleaning liquid nozzle ejecting the cleaning liquid, and a flow rate changer that changes the flow rate of the cleaning liquid to be ejected from the cleaning liquid nozzle between a first flow rate at which the cleaning liquid ejected from the cleaning liquid nozzle goes toward the first position and a second flow rate at which the cleaning liquid ejected from the cleaning liquid nozzle goes toward the second position, the flow rate changer makes the cleaning liquid nozzle eject the cleaning liquid at the first flow rate to eject the cleaning liquid from the cleaning liquid nozzle to the first position, and the flow rate changer makes the cleaning liquid nozzle eject the cleaning liquid at the second flow rate to eject the cleaning liquid from the cleaning liquid nozzle to the second position. In this configuration, the flow rate changer switches the flow rate of the cleaning liquid to be ejected from the cleaning liquid nozzle between the first flow rate and the second flow rate, thereby allowing the clean cleaning liquid to be supplied to each of the cap member and the cleaning member.

The printer may be configured so that the cleaning member is a cleaning roller that is driven to rotate by the relative movement of the cap member in the movement direction. In this configuration, it is possible to clean the cap member by the cleaning roller to which the clean cleaning liquid ejected.

The printer may be configured so that the cleaning member includes a liquid retaining member that retains the cleaning liquid by absorbing the cleaning liquid, and the liquid retaining member cleans the cap member by coming into contact with the cap member. In this configuration, it is possible to clean the cap member with the clean cleaning liquid retained by the liquid retaining member.

A particular configuration of the liquid retaining member is assumed in various ways. For example, the liquid retaining member may be a porous member. The porous member may be a sponge.

The printer may be configured so that the cap member includes a reservoir having an opening that opens toward the printing head, and a peripheral part provided around the opening of the reservoir, during implementation of the capping, while the opening of the reservoir faces the ink nozzle, the peripheral part abuts on the printing head, the cleaning member cleans the peripheral part of the cap member by coming into contact with the peripheral part, and the cleaning liquid ejection unit ejects the cleaning liquid to the reservoir of the cap member. In this configuration, it is possible to clean the reservoir of the cap member with the clean cleaning liquid ejected from the cleaning liquid ejection unit to the reservoir and to clean the peripheral part of the cap member with the clean cleaning liquid ejected from the cleaning liquid ejection unit to the cleaning member.

The printer may be configured so that the cap member performs the capping while the cleaning liquid ejected from the cleaning liquid ejection unit is pooled in the reservoir. In this configuration, it is possible to retain moisture at the ink nozzle with the cleaning liquid pooled in the reservoir during the capping.

The printer may be configured so that the cap member receives ink ejected from the ink nozzle of the printing head by the reservoir pooling the cleaning liquid ejected from the cleaning liquid ejection unit. In this configuration, it is possible to suppress the reservoir from contamination caused by ink adhering to a wall surface of the reservoir after ejected from the nozzle.

The printer may further comprises: a wiper that wipes away ink from the printing head; and a wiper slide driving part that causes the wiper to slide on the printing head by driving at least one of the wiper and the printing head, wherein the cleaning liquid ejection unit ejects the cleaning liquid to the cleaning member while the wiper slide driving part causes the wiper to contact the cleaning member, and the cleaning liquid ejected to the cleaning member reaches the wiper through the cleaning member. In this configuration, it is possible to supply the cleaning liquid to the wiper and clean the wiper.

The printer may further comprises: a tray including a bottom surface on which the cap member is arranged, wherein while the driving part locates the bottom surface of the tray at the second position, the cleaning liquid ejection unit ejects the cleaning liquid to the second position to eject the cleaning liquid to the bottom surface of the tray. In this configuration, it is possible to supply the clean cleaning liquid to the bottom surface of the tray.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printer comprising:

a printing head that ejects ink from an ink nozzle;

a cap member that performs capping of abutting on the printing head while the cap member faces the ink nozzle;

a cleaning member that cleans the cap member by coming into contact with the cap member; and a cleaning liquid ejection unit that ejects a cleaning liquid to an ejection target that is one of the cleaning member and the cap member, wherein the cleaning liquid ejection unit is configured to switch the ejection target between the cap member and the cleaning member and eject the cleaning liquid to the ejection target.

2. The printer according to claim 1, further comprising:

a driving part that moves the cap member relatively in a predetermined movement direction relative to the cleaning member by driving at least one of the cleaning member and the cap member, wherein the cleaning member to which the cleaning liquid is ejected from the cleaning liquid ejection unit comes into contact with the cap member that is moved relatively in the movement direction by the driving part to clean the cap member.

3. The printer according to claim 2, wherein the cleaning liquid ejection unit is configured to select a destination of ejection of the cleaning liquid from a first position where the cleaning member is located and a second position different from the first position in the movement direction, the cleaning liquid ejection unit ejects the cleaning liquid to the cleaning member by ejecting the cleaning liquid to the first position, and the cleaning liquid ejection unit ejects the cleaning liquid to the cap member by ejecting the cleaning liquid to the second position while the driving part locates the cap member at the second position.

4. The printer according to claim 3, wherein the cleaning liquid ejection unit includes a liquid feed pipe feeding the cleaning liquid, a solenoid valve connected to the liquid feed pipe, a first cleaning liquid nozzle connected to the solenoid valve, and a second cleaning liquid nozzle connected to the solenoid valve, the first cleaning liquid nozzle faces the first position, the second cleaning liquid nozzle faces the second position, the solenoid valve is configured to perform first flow path connecting operation and second flow path connecting operation selectively, the first flow path connecting operation being operation of feeding the cleaning liquid from the liquid feed pipe to the first cleaning liquid nozzle by forming flow path connection between the liquid feed pipe and the first cleaning liquid nozzle while disconnecting the liquid feed pipe and the second cleaning liquid nozzle from each other, the second flow path connecting operation being operation of feeding the cleaning liquid from the liquid feed pipe to the second cleaning liquid nozzle by forming flow path connection between the liquid feed pipe and the second cleaning liquid nozzle while disconnecting the liquid feed pipe and the first cleaning liquid nozzle from each other, the solenoid valve performs the first flow path connecting operation to eject the cleaning liquid from the first cleaning liquid nozzle to the first position, and the solenoid valve performs the second flow path connecting operation to eject the cleaning liquid from the second cleaning liquid nozzle to the second position.

5. The printer according to claim 3, wherein the cleaning liquid ejection unit includes a cleaning liquid nozzle ejecting the cleaning liquid, and a posture changer that changes the posture of the cleaning liquid nozzle between a first posture in which the cleaning liquid nozzle ejects the cleaning liquid going toward the first position and a second posture in which the cleaning liquid nozzle ejects the cleaning liquid going toward the second position, the posture changer locates the cleaning liquid nozzle in the first posture to eject the cleaning liquid from the cleaning liquid nozzle to the first position, and the posture changer locates the cleaning liquid nozzle in the second posture to eject the cleaning liquid from the cleaning liquid nozzle to the second position.

6. The printer according to claim 3, wherein the cleaning liquid ejection unit includes a cleaning liquid nozzle ejecting the cleaning liquid, and a flow rate changer that changes the flow rate of the cleaning liquid to be ejected from the cleaning liquid nozzle between a first flow rate at which the cleaning liquid ejected from the cleaning liquid nozzle goes toward the first position and a second flow rate at which the cleaning liquid ejected from the cleaning liquid nozzle goes toward the second position, the flow rate changer makes the cleaning liquid nozzle eject the cleaning liquid at the first flow rate to eject the cleaning liquid from the cleaning liquid nozzle to the first position, and the flow rate changer makes the cleaning liquid nozzle eject the cleaning liquid at the second flow rate to eject the cleaning liquid from the cleaning liquid nozzle to the second position.

7. The printer according to claim 3, further comprising:

a tray including a bottom surface on which the cap member is arranged, wherein while the driving part locates the bottom surface of the tray at the second position, the cleaning liquid ejection unit ejects the cleaning liquid to the second position to eject the cleaning liquid to the bottom surface of the tray.

8. The printer according to claim 2, wherein the cleaning member is a cleaning roller that is driven to rotate by the relative movement of the cap member in the movement direction.

9. The printer according to claim 1, wherein the cleaning member includes a liquid retaining member that retains the cleaning liquid by absorbing the cleaning liquid, and the liquid retaining member cleans the cap member by coming into contact with the cap member.

10. The printer according to claim 9, wherein the liquid retaining member is a porous member.

11. The printer according to claim 10, wherein the porous member is sponge.

12. The printer according to claim 1, wherein the cap member includes a reservoir having an opening that opens toward the printing head, and a peripheral part provided around the opening of the reservoir, during implementation of the capping, while the opening of the reservoir faces the ink nozzle, the peripheral part abuts on the printing head, the cleaning member cleans the peripheral part of the cap member by coming into contact with the peripheral part, and the cleaning liquid ejection unit ejects the cleaning liquid to the reservoir of the cap member.

13. The printer according to claim 12, wherein the cap member performs the capping while the cleaning liquid ejected from the cleaning liquid ejection unit is pooled in the reservoir.

14. The printer according to claim 12, wherein the cap member receives ink ejected from the ink nozzle of the printing head by the reservoir pooling the cleaning liquid ejected from the cleaning liquid ejection unit.

15. The printer according to claim 1, further comprising:

a wiper that wipes away ink from the printing head; and a wiper slide driving part that causes the wiper to slide on the printing head by driving at least one of the wiper and the printing head, wherein the cleaning liquid ejection unit ejects the cleaning liquid to the cleaning member while the wiper slide driving part causes the wiper to contact the cleaning member, and the cleaning liquid ejected to the cleaning member reaches the wiper through the cleaning member.

16. A cleaning liquid supply method of supplying a cleaning liquid to a cap member and a cleaning member, the cap member performing capping of abutting on a printing head that ejects ink from an ink nozzle while the cap member faces the ink nozzle, the cleaning member cleaning the cap member by coming into contact with the cap member, the method comprising the steps of:

ejecting the cleaning liquid to an ejection target that is one of the cleaning member and the cap member from a cleaning liquid ejection unit that ejects the cleaning liquid to the ejection target; and switching the ejection target between the cap member and the cleaning member.

* * * * *